US009654259B2

(12) United States Patent
Nakao et al.

(10) Patent No.: US 9,654,259 B2
(45) Date of Patent: *May 16, 2017

(54) BASE STATION, TERMINAL, SEARCH SPACE SETTING METHOD AND DECODING METHOD

(71) Applicant: Sun Patent Trust, New York, NY (US)

(72) Inventors: Seigo Nakao, Singapore (SG); Akihiko Nishio, Osaka (JP); Ayako Horiuchi, Kanagawa (JP); Daichi Imamura, Beijing (CN)

(73) Assignee: Sun Patent Trust, New York, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/681,867

(22) Filed: Apr. 8, 2015

(65) Prior Publication Data

US 2015/0215086 A1    Jul. 30, 2015

Related U.S. Application Data

(63) Continuation of application No. 13/806,631, filed as application No. PCT/JP2011/003901 on Jul. 7, 2011, now Pat. No. 9,031,025.

(30) Foreign Application Priority Data

Jul. 21, 2010 (JP) ................................ 2010-164308

(51) Int. Cl.
*H04W 4/00* (2009.01)
*H04L 5/00* (2006.01)
(Continued)

(52) U.S. Cl.
CPC ............ *H04L 5/0005* (2013.01); *H04L 5/001* (2013.01); *H04L 5/006* (2013.01); *H04L 5/0023* (2013.01);
(Continued)

(58) Field of Classification Search
USPC ......... 370/241–252, 312–338; 455/422–434, 455/434–466
See application file for complete search history.

(56) References Cited

U.S. PATENT DOCUMENTS 7,733,827 B2 *   6/2010   Kim ...................... H04L 5/0091
                                                                370/328
7,873,004 B2 *   1/2011   Lee ....................... H04L 5/0007
                                                                370/311
(Continued)

FOREIGN PATENT DOCUMENTS

CN          101610564 A     12/2009
JP          2009-286655 A   12/2009
(Continued)

OTHER PUBLICATIONS

Huawei, "Difficulty in Detection of PDCCHs for Type 2 Relay," R1-100274, 3GPP TSG RAN WG1 meeting #59bis, Agenda Item: 8.3, Valencia, Spain, Jan. 18-22, 2010, 2 pages.
(Continued)

*Primary Examiner* — Man Phan
(74) *Attorney, Agent, or Firm* — Seed Intellectual Property Law Group LLP

(57) ABSTRACT

The invention provides a base station that does not cause the number of blind decodings to be increased and further can prevent the flexibility of resource allocation from degrading. A search space setting unit (103) sets search spaces each of which is constituted by one or more control channel elements (CCEs) and each of which is to be decoded in the terminals and each of which is defined by a plurality of to-be-decoded candidates. An allocating unit (108) places, in one of the plurality of to-be-decoded candidates included in the search space, a control channel. The number of connections of CCEs constituting the to-be-decoded candidate is associated with the number of to-be-decoded candidates.

(Continued)

The search space setting unit (103) causes, in accordance with the control channel to be transmitted, the association of the number of connections of CCEs constituting the to-be-decoded candidate with the number of to-be-decoded candidates to differ.

17 Claims, 14 Drawing Sheets

(51) Int. Cl.
    *H04W 72/04*     (2009.01)
    *H04W 72/08*     (2009.01)

(52) U.S. Cl.
    CPC .......... *H04L 5/0032* (2013.01); *H04L 5/0053* (2013.01); *H04L 5/0064* (2013.01); *H04L 5/0094* (2013.01); *H04W 72/042* (2013.01); *H04W 72/08* (2013.01); *H04L 5/0048* (2013.01)

(56) References Cited

U.S. PATENT DOCUMENTS

| | | | |
|---|---|---|---|
| 8,400,939 B2* | 3/2013 | Kim | H04W 48/16 370/252 |
| 8,401,542 B2* | 3/2013 | Chung | H04L 5/0007 370/485 |
| 8,441,996 B2* | 5/2013 | Kim | H04W 36/385 370/252 |
| 8,463,262 B2* | 6/2013 | Kwon | H04L 5/0091 455/434 |
| 2008/0225786 A1* | 9/2008 | Han | H04W 72/14 370/329 |
| 2010/0232388 A1 | 9/2010 | Nakao et al. | |
| 2010/0260124 A1 | 10/2010 | Noshio et al. | |
| 2010/0279628 A1* | 11/2010 | Love | H04L 5/0091 455/70 |
| 2011/0075624 A1* | 3/2011 | Papasakellariou | H04L 5/0053 370/329 |
| 2011/0243090 A1* | 10/2011 | Grovlen | H04L 1/18 370/329 |
| 2012/0033627 A1 | 2/2012 | Li et al. | |
| 2012/0113932 A1 | 5/2012 | Nishio et al. | |
| 2013/0114563 A1 | 5/2013 | Oizumi et al. | |
| 2013/0114583 A1* | 5/2013 | Park | H04W 52/0216 370/338 |

FOREIGN PATENT DOCUMENTS

| | | |
|---|---|---|
| JP | 2010-64431 A | 3/2010 |
| WO | 2008/157692 A | 12/2008 |
| WO | 2009/057283 A1 | 5/2009 |
| WO | 2009/057286 A1 | 5/2009 |

OTHER PUBLICATIONS

"3rd Generation Partnership Project; Technical Specification Group Radio Access Network; Evolved Universal Terrestrial Radio Access (E-UTRA); Physical Channels and Modulation (Release 9)," Technical Specification, 3GPP TS 36.211 V9.1.0, Mar. 2010, 85 pages.

"3rd Generation Partnership Project; Technical Specification Group Radio Access Network; Evolved Universal Terrestrial Radio Access (E-UTRA); Multiplexing and channel coding (Release 9)," Technical Specification, 3GPP TS 36.212 V9.2.0, Jun. 2010, 61 pages.

"3rd Generation Partnership Project; Technical Specification Group Radio Access Network; Evolved Universal Terrestrial Radio Access (E-UTRA); Physical layer procedures (Release 9)," Technical Specification, 3GPP TS 36.213 V9.2.0, Jun. 2010, 80 pages.

CMCC, "Un R-PDCCH Design," R1-104118, Agenda Item: 6.6.1, 3GPP TSG-RAN WG1 #61bis, Dresden, Germany, Jun. 28-Jul. 2, 2010, 7 pages.

English translation of Chinese Search Report dated Dec. 25, 2014, for corresponding CN Application No. 201180034975.0, 2 pages.

International Search Report, dated Aug. 2, 2011, for International Application No. PCT/JP2011/003901, 4 pages.

LG Electronics Inc., "Backhaul Control Channel Design in Downlink," R1-102700, Agenda Item: 6.6.1.2, TSG-RAN WG1 Meeting #61, Montreal, Canada, May 10-14, 2010, 5 pages.

Motorola, "PDCCH Design for Carrier Aggregation and Post Rel-8 features," R1-092641, Agenda Item: 15.4, 3GPP TSG RAN1 #57bis, Los Angeles, USA, Jun. 29-Jul. 3, 2009, 5 pages.

NEC Group, "Supporting frequency diversity and frequency selective R-PDCCH transmissions," R1-103062, Agenda Item: 6.6.1.2, TSG-RAN WG1#61, Montreal, Canada, May 10-14, 2010, 6 pages.

Nokia, Nokia Siemens Networks, "Discussion on R-PDCCH Search Space Design," R1-103815, Agenda Item: 6.6.1, 3GPP TSG-RAN WG1 Meeting #61bis, Dresden, Germany, Jun. 28-Jul. 2, 2010, 3 pages.

Nokia Siemens Networks, Nokia, "On DL Backhaul Control Channel Design Aspects," R1-102969, Agenda Item: 6.6.1.2, 3GPP TSG-RAN WG1 Meeting #61, Montreal, Canada, May 10-14, 2010, 5 pages.

Panasonic, "R-PDCCH placement," R1-102881, Agenda Item: 6.6.1.2 Backhaul control channel design, 3GPP TSG RAN WG1 Meeting #61, Montreal, Canada, May 10-14, 2010, 5 pages.

Samsung, "R-PDCCH search space design," R1-103040, Agenda Item: 6.6.1.2, 3GPP TSG RAN WG1 Meeting #61, Montreal, Canada, May 10-14, 2010, 3 pages.

CMCC, "Clarification on R-PDCCH," R1-103232, 3GPP TSG-RAN WG1 #61, Agenda Item: 6.6.1.2, May 10-14, 2010, Montreal, Canada, 3 pages.

Extended European Search Report dated May 22, 2015, for corresponding EP Application No. 11809419.2-1851 / 2597919, 6 pages.

Samsung, "R-PDCCH multiplexing and search space," R1-100135, 3GPP TSG RAN WG1 Meeting #59bis, Agenda Item: 7.5.1, Jan. 18-22, 2010, Valencia, Spain, 5 pages.

* cited by examiner

| PDCCH format | Number of CCEs | Number of candidates in C-SS | Number of candidates in UE-SS |
|---|---|---|---|
| 0 | 1 | — | 6 |
| 1 | 2 | — | 6 |
| 2 | 4 | 4 | 2 |
| 3 | 8 | 2 | 2 |

| PDCCH REGION | | R-PDCCH REGION | |
|---|---|---|---|
| NUMBER OF CONCATENATED CCEs L | NUMBER OF BLIND DECODING OPERATIONS | NUMBER OF CONCATENATED CCEs L | NUMBER OF BLIND DECODING OPERATIONS |
| 8 | 6 | N/A | |
| 4 | 6 | | |
| 2 | 18 | | |
| 1 | 18 | | |

FIG.11B

| PDCCH REGION | | R-PDCCH REGION | |
|---|---|---|---|
| NUMBER OF CONCATENATED CCEs L | NUMBER OF BLIND DECODING OPERATIONS | NUMBER OF CONCATENATED CCEs L | NUMBER OF BLIND DECODING OPERATIONS |
| 8 | 6 | 8 | 3 |
| 4 | 6 | 4 | 3 |
| 2 | 6 | 2 | 9 |
| 1 | 6 | 1 | 9 |

FIG.13A

| PDCCH REGION | | R-PDCCH REGION | |
|---|---|---|---|
| NUMBER OF CONCATENATED CCEs L | NUMBER OF BLIND DECODING OPERATIONS | NUMBER OF CONCATENATED CCEs L | NUMBER OF BLIND DECODING OPERATIONS |
| 8 | 6 | N/A | |
| 4 | 6 | | |
| 2 | 18 | | |
| 1 | 18 | | |

FIG.13B

| PDCCH REGION (NUMBER OF REs/CCE=36) | | R-PDCCH REGION (NUMBER OF REs/CCE=18) | |
|---|---|---|---|
| NUMBER OF CONCATENATED CCEs L | NUMBER OF BLIND DECODING OPERATIONS | NUMBER OF CONCATENATED CCEs L | NUMBER OF BLIND DECODING OPERATIONS |
| 8 | 6 | 8 | 3 |
| 4 | 6 | 4 | 9 |
| 2 | 6 | 2 | 9 |
| 1 | 6 | 1 | 3 |

FIG.15A

| PDCCH REGION | | R-PDCCH REGION | |
|---|---|---|---|
| NUMBER OF CONCATENATED CCEs L | NUMBER OF BLIND DECODING OPERATIONS | NUMBER OF CONCATENATED CCEs L | NUMBER OF BLIND DECODING OPERATIONS |
| 8 | 6 | N/A | |
| 4 | 6 | | |
| 2 | 18 | | |
| 1 | 18 | | |

FIG.15B

| PDCCH REGION (NUMBER OF REs/CCE=36,DCI SIZE=42bits) | | R-PDCCH REGION (NUMBER OF REs/CCE=18,DCI SIZE=60bits) | |
|---|---|---|---|
| NUMBER OF CONCATENATED CCEs L | NUMBER OF BLIND DECODING OPERATIONS | NUMBER OF CONCATENATED CCEs L | NUMBER OF BLIND DECODING OPERATIONS |
| 8 | 6 | 8 | 4 |
| 4 | 6 | 4 | 8 |
| 2 | 6 | 2 | 8 |
| 1 | 6 | 1 | 4 |

BASE STATION, TERMINAL, SEARCH SPACE SETTING METHOD AND DECODING METHOD

BACKGROUND

Technical Field

The claimed invention relates to a base station, a terminal, a method of configuring a search space, and a decoding method.

Description of the Related Art

In 3rd Generation Partnership Project Radio Access Network Long Term Evolution (3GPP-LTE (hereinafter, referred to as LTE)), Orthogonal Frequency Division Multiple Access (OFDMA) is adopted as a downlink communication scheme, and Single Carrier Frequency Division Multiple Access (SC-FDMA) is adopted as an uplink communication scheme (e.g., see NPL-1, NPL-2, and NPL-3).

In LTE, a base station apparatus for radio communications (hereinafter, abbreviated as "base station") performs communications by allocating a resource block (RB) in a system band to a terminal apparatus for radio communications (hereinafter, abbreviated as "terminal") for every time unit called "subframe." The base station also transmits allocation control information (i.e., L1/L2 control information) for the notification of the result of resource allocation of downlink data and uplink data to the terminal. The allocation control information is transmitted to the terminal through a downlink control channel such as a Physical Downlink Control Channel (PDCCH). A resource region to which a PDCCH is to be mapped is specified. As shown in FIG. 1, a PDCCH covers the entire system bandwidth in the frequency-domain and the region occupied by the PDCCH in the time-domain varies between a leading first OFDM symbol and a third OFDM symbol in a single subframe. A signal indicating a range of OFDM symbols occupied by a PDCCH in the time-domain direction is transmitted through a Physical Control Format Indicator Channel (PCFICH).

Each PDCCH also occupies a resource composed of one or more consecutive control channel elements (CCEs). In a PDCCH, one CCE consists of 36 resource elements (RE). In LTE, the number of CCEs occupied by a PDCCH (the number of concatenated CCEs: CCE aggregation level or merely Aggregation level) is selected from 1, 2, 4, and 8 depending on the number of bits of allocation control information or the condition of a propagation path of a terminal. In LTE a frequency band having a system bandwidth of up to 20 MHz is supported.

Allocation control information transmitted from a base station is referred to as downlink control information (DCI). If a base station allocates a plurality of terminals to one subframe, the base station transmits a plurality of items of DCI at a time. In this case, in order to identify a terminal to which each item of DCI is transmitted, the base station transmits the DCI with CRC bits included therein, the bits being masked (or scrambled) with a terminal ID of the transmission destination terminal. Then, the terminal performs demasking (or descrambling) on the CRC bits of a plurality of items of possible DCI directed to the terminal with its own ID, thereby blind-decoding a PDCCH to detect the DCI directed to the terminal.

DCI also includes resource information allocated to a terminal by a base station (resource allocation information) and a modulation and channel coding scheme (MCS). Furthermore, DCI has a plurality of formats for uplink, downlink Multiple Input Multiple Output (MIMO) transmission, and downlink non-consecutive band allocation. A terminal needs to receive both downlink allocation control information (i.e., allocation control information about a downlink) and uplink allocation control information (i.e., allocation control information about an uplink) which have a plurality of formats.

For example, for the downlink allocation control information, formats of a plurality of sizes are defined depending on a method for controlling a transmission antenna of a base station and a method for allocating a resource. Among the formats, a downlink allocation control information format for consecutive band allocation (hereinafter, simply referred to as "downlink allocation control information") and an uplink allocation control information format for consecutive band allocation (hereinafter, simply referred to as "uplink allocation control information") have the same size. These formats (i.e., DCI formats) include type information (for example, a one-bit flag) indicating the type of allocation control information (downlink allocation control information or uplink allocation control information). Thus, even if DCI indicating downlink allocation control information and DCI indicating uplink allocation control information have the same size, a terminal can determine whether specific DCI indicates downlink allocation control information or uplink allocation control information by checking type information included in allocation control information.

The DCI format in which uplink allocation control information for consecutive band allocation is transmitted is referred to as "DCI format 0" (hereinafter, referred to as "DCI 0"), and the DCI format in which downlink allocation control information for consecutive band allocation is transmitted is referred to as "DCI format 1A" (hereinafter, referred to as "DCI 1A"). Since DCI 0 and DCI 1A are of the same size and distinguishable from each other by referring to type information as described above, hereinafter, DCI 0 and DCI 1A will be collectively referred to as DCI 0/1A.

In addition to these DCI formats, there are other formats for downlink, such as DCI format 1 used for non-consecutive band allocation (hereinafter, referred to as DCI 1) and DCI formats 2 and 2A used for allocating spatial multiplexing MIMO transmission (hereinafter, referred to as DCI 2 and 2A). DCI 1, DCI 2, and DCI 2A are formats that are dependent on a downlink transmission mode of a terminal (for non-consecutive band allocation or spatial multiplexing MIMO transmission) and configured for each terminal. In contrast, DCI 0/1A is a format that is independent of a transmission mode and can be used for a terminal having any transmission mode, i.e., a format commonly used for every terminal. If DCI 0/1A is used, single-antenna transmission or a transmission diversity scheme is used as a default transmission mode.

Also, for the purpose of reducing the number of blind decoding operations to reduce a circuit scale of a terminal, a method for limiting CCEs targeted for blind decoding for each terminal has been under study. This method limits a CCE region that may be targeted for blind decoding by each terminal (hereinafter, referred to as "search space (SS)"). As used herein, a CCE region unit allocated to each terminal (i.e., corresponding to a unit for blind decoding) is referred to as "downlink control information allocation region candidate (i.e., DCI allocation region candidate) or downlink control information allocation candidate (i.e., DCI allocation candidate)" or "unit region candidate targeted for decoding (or candidate targeted for decoding)."

In LTE, a search space is configured for each terminal at random. The number of CCEs that forms a search space is defined based on the number of concatenated CCEs of a PDCCH. For example, as shown in FIG. 2, the number of CCEs forming search spaces is 6, 12, 8, and 16 in association with the number of concatenated CCEs of PDCCHs 1, 2, 4, and 8, respectively. In this case, the number of unit region candidates targeted for decoding is 6 (=6/1), 6 (=12/2), 2 (=8/4), and 2 (=16/8) in association with the number of concatenated CCEs of the PDCCHs, 1, 2, 4, and 8, respectively (see FIG. 3). In other words, the total number of unit region candidates targeted for decoding is limited to 16. Thus, since each terminal may perform blind-decoding only on a group of unit region candidates targeted for decoding in a search space allocated to the terminal in each subframe, the number of blind decoding operations can be reduced. A search space in each terminal is configured using a terminal ID of each terminal and a hash function for randomization. A terminal-specific CCE region is referred to as "UE specific search space (UE-SS)".

The PDCCH also includes control information for data allocation, the information being common to a plurality of terminals and notified to the plurality of terminals at a time (for example, allocation information about downlink notification signals and allocation information about signals for paging) (hereinafter, referred to as "control information for a common channel"). To transmit the control information for a common channel, a CCE region common to all the terminals that are to receive downlink notification signals (hereinafter, referred to as "common search space: C-SS") is used for the PDCCH. A C-SS includes six unit region candidates targeted for decoding in total, namely, 4 (=16/4) and 2 (=16/8) candidates with respect to the number of concatenated CCEs, 4 and 8, respectively (see FIG. 3).

In a UE-SS, the terminal performs blind-decoding for the DCI formats of two sizes, i.e., the DCI format (DCI 0/1A) common to all the terminals and the DCI format (one of DCI 1, DCI 2 and DCI 2A) dependent on a transmission mode. For example, in a UE-SS, the terminal performs 16 blind-decoding operations in each of the DCI formats of the two sizes as described above. A transmission mode notified by the base station determines for which two sizes of the DCI formats the blind decoding is performed. In contrast, in a C-SS, the terminal performs six blind-decoding operations on each DCI format 1C, which is a format for common channel allocation (hereinafter, referred to as "DCI 1C") and DCI 1A, (i.e., 12 blind decoding operations in total) regardless of a notified transmission mode.

DCI 1A is used for common channel allocation and DCI 0/1A used for terminal-specific data allocation have the same size, and terminal IDs are used to distinguish between DCI 1A and DCI 0/1A. Thus, the base station can transmit DCI 0/1A used for terminal-specific data allocation also in a C-SS without an increase in the number of blind decoding operations to be performed by the terminals.

Also, the standardization of 3GPP LTE-Advanced (hereinafter, referred to as LTE-A), which provides a data transfer rate higher than that of LTE, has been started. In LTE-A, in order to achieve a downlink transfer rate up to 1 Gbps and an uplink transfer rate up to 500 Mbps, a base station and a terminal capable of communicating at a wideband frequency of 40 MHz or higher (hereinafter, referred to as LTE-A terminal) will be introduced. An LTE-A system is also required to support a terminal designed for an LTE system (hereinafter, referred to as LTE terminal) in the system in addition to an LTE-A terminal.

In LTE-A, a new uplink transmission method will be introduced that uses a non-consecutive band allocation and MIMO. Accordingly, the definitions of new DCI formats (e.g., DCI formats 0A and 0B (hereinafter, referred to as DCI 0A and DCI 0B)) (e.g., see NPL-4) are being studied. In other words, DCI 0A and DCI 0B are DCI formats that depend on an uplink transmission mode.

As described, in LTE-A, if a DCI format (any one of DCI 1, DCI 2, and DCI 2A) dependent on a downlink transmission mode, a DCI format dependent on an uplink transmission mode (any one of DCI 0A and DCI 0B), and a DCI format independent of a transmission mode and common to all the terminals (DCI 0/1A) are used in UE-SS, then the terminal performs blind-decoding (monitoring) on items of the DCI among the abovementioned three DCI formats. For example, as described above, since a UE-SS needs 16 blind decoding operations in one DCI format, the total number of blind decoding operations in the UE-SS is 48 (=16×3). Then, 60 blind decoding operations in total is needed after adding 12 (=6×2), i.e., the number of blind decoding operations for the two DCI formats in the C-SS.

Additionally, in LTE-A, to achieve an increased coverage, the introduction of radio communication relay apparatus (hereinafter, referred to as "relay station" or "Relay Node" (RE)) has been specified (see FIG. 4). Accordingly, the standardization of downlink control channels from base stations to relay stations (hereinafter, referred to as "R-PDCCH") is under way (e.g., see NPL-5, NPL-6, NPL-7, and NPL-8). At present, the following matters are being studied in relation to the R-PDCCH. FIG. 5 illustrates an example of an R-PDCCH region.

(1) A mapping start position in the time-domain of an R-PDCCH is fixed to a fourth OFDM symbol from a leading symbol of one subframe, and thus does not depend on the rate at which a PDCCH occupies OFDM symbols in the time-domain.

(2) As a mapping method in the frequency-domain of an R-PDCCH, two disposing methods, "localized" and "distributed" are supported.

(3) As reference signals for demodulation, Common Reference Signal (CRS) and Demodulation Reference Signal (DM-RS) are supported. The base station notifies the relay station of which one of the reference signals is used.

CITATION LIST

Non-Patent Literature

NPL 1: 3GPP TS 36.211 V9.1.0, "Physical Channels and Modulation (Release 9)," March 2010
NPL 2: 3GPP TS 36.212 V9.2.0, "Multiplexing and channel coding (Release 9)," June 2010
NPL 3: 3GPP TS 36.213 V9.2.0, "Physical layer procedures (Release 9)," June 2010
NPL 4: 3GPP TSG RAN WG1 meeting, R1-092641, "PDCCH design for Carrier aggregation and Post Rel-8 feature," June 2009
NPL 5: 3GPP TSG RAN WG1 meeting, R1-102700, "Backhaul Control Channel Design in Downlink," May 2010
NPL 6: 3GPP TSG RAN WG1 meeting, R1-102881, "R-PDCCH placement," May 2010
NPL 7: 3GPP TSG RAN WG1 meeting, R1-103040, "R-PDCCH search space design," May 2010
NPL 8: 3GPP TSG RAN WG1 meeting, R1-103062, "Supporting frequency diversity and frequency selective R-PDCCH transmissions," May 2010

SUMMARY OF INVENTION

Technical Problem

It is assumed that resources for a resource region to which a PDCCH for a terminal under the control of a base station is mapped (hereinafter, referred to as "PDCCH region") may be insufficient. It is thought that the DCI for the terminal under the control of the base station is included in the resource region (hereinafter, referred to as "R-PDCCH region") to which the R-PDCCH is mapped (see FIG. 6), as a method of overcoming insufficient resources.

Even if DCI for a terminal under the control of a base station is included in an R-PDCCH region, similarly to a PDCCH, each R-PDCCH occupies a resource formed by one or more consecutive relay-control channel elements (R-CCEs). The number of R-CCEs occupied by the R-PDCCH (i.e., the number of concatenated R-CCEs: Relay CCE aggregation level) is selected from 1, 2, 4, and 8 depending on the number of allocation control information bits and the condition of a propagation path for the terminal.

However, simple addition of an R-PDCCH region to a PDCCH region as a resource region for transmitting DCI to a terminal connected to a base station (a terminal under the control of a base station) may disadvantageously lead to an increase in the number of blind decoding operations to be performed by the terminal, resulting in increases in power consumption, processing delay of the terminal, and circuit scale. For example, according to the above-described configuration of a search space, in one subframe, a search space is configured for each of a PDCCH region and an R-PDCCH region. Thus, if the number of blind decoding operations to be performed by a terminal in each region is 60 as mentioned above, the terminal would repeat 120 blind decoding operations (=60×2 regions) in total for each subframe. In other words, the number of blind decoding operations increases and the configuration of a terminal becomes complicated.

Also, another possible approach of configuring the search space is allocation of a search space to each of a PDCCH region and an R-PDCCH region under the assumption that the total number of region candidates for blind decoding to be performed by a terminal in one subframe (i.e., the total number of blind decoding operations) is set to the number used in the related art as described (e.g., 60 operations). In this case, the size of a search space in each of the PDCCH region and the R-PDCCH region is substantially reduced by half, and thus the possibility that the base station is not allowed to allocate CCEs to DCI for a specific terminal (i.e., a blocking probability) may increase. For this reason, the base station must change the timing of transmission of control signals to the terminal or use concatenated CCEs exceeding the necessary and sufficient number of concatenated CCEs. However, if the timing of transmission of control signals varies, a transmission delay may arise. Furthermore, an unnecessary increase in concatenated CCEs may result in a waste of resources for an R-PDCCH region. In contrast, a smaller number of concatenated CCEs may lead to insufficient quality of communications for the terminal.

For that reason, inefficient use of resources may cause a decrease in system throughput. Thus, there is a need for a method of preventing a decrease in flexibility of resource allocation in the base station without an increase in the number of blind decoding operations to be performed by the terminal when DCI for a terminal under the control of a base station is transmitted using a PDCCH region and an R-PDCCH region.

An object of the claimed invention is to provide a base station, a terminal, a method of configuring a search space, and a decoding method that can prevent a decrease in flexibility of resource allocation in the base station without an increase in the number of blind decoding operations to be performed by the terminal, even if DCI for the terminal under the control of the base station is transmitted using a PDCCH region and an R-PDCCH region.

Solution to Problem

A base station according to an aspect of the claimed invention includes: a configuration section that configures a search space defined by a plurality of candidates targeted for decoding at a terminal, each of the candidates being formed by at least one control channel element (CCE); and a transmitting section that allocates a control channel in any of the plurality of candidates targeted for decoding included in the configured search space and transmits the control channel to the terminal, wherein the number of the concatenated CCEs forming each of the candidates targeted for decoding is associated with the number of the candidates targeted for decoding, and the configuration section varies the association between the number of the concatenated CCEs forming each of the candidates targeted for decoding and the number of the candidates targeted for decoding depending on the control channel to be transmitted.

A terminal according to an aspect of the claimed invention includes: a receiving section that receives a control channel allocated in a search space defined by a plurality of candidates targeted for decoding, each of the candidates being formed by at least one control channel element (CCE); and a decoding section that decodes the control channel directed to the terminal, the channel being allocated in any one of the plurality of candidates targeted for decoding, wherein the number of concatenated CCEs forming each of the candidates targeted for decoding is associated with the number of the candidates targeted for decoding, and the association between the number of concatenated CCEs forming each of the candidates targeted for decoding and the number of the candidates targeted for decoding varies depending on the control channel.

A method of configuring a search space according to an aspect of the claimed invention is a method of configuring a search space defined by a plurality of candidates targeted for decoding at a terminal, each of the candidates being formed by at least one control channel element (CCE), the method comprising associating the number of concatenated CCEs forming each of the candidates targeted for decoding with the number of the candidates targeted for decoding, wherein the association between the number of concatenated CCEs forming each of the candidates targeted for decoding and the number of the candidates targeted for decoding varies depending on a control channel allocated in any one of the candidates targeted for decoding included in the search space.

A decoding method according to an aspect of the claimed invention is a method of decoding a control channel allocated in a search space defined by a plurality of candidates targeted for decoding, each of the candidates being formed by at least one control channel element (CCE), wherein the number of concatenated CCEs forming each of the candidates targeted for decoding is associated with the number of the candidates targeted for decoding, and the association between the number of concatenated CCEs forming each of the candidates targeted for decoding and the number of the candidates targeted for decoding varies depending on the control channel, the method comprising monitoring the plurality of candidates targeted for decoding and decoding the control channel directed to a device, the channel being allocated in any one of the plurality of candidates targeted for decoding.

Advantageous Effects of Invention

According to the claimed invention, even if DCI for a terminal under the control of a base station is transmitted using a PDCCH region and an R-PDCCH region, a decrease in flexibility of resource allocation in the base station can be prevented without an increase in the number of blind decoding operations to be performed by the terminal.

BRIEF DESCRIPTION OF THE SEVERAL VIEWS OF THE DRAWINGS

FIG. 3 is a diagram for explaining search spaces;
FIGS. 11A and 11B are diagrams for explaining rules for configuring a search space according to Embodiment 1 of the claimed invention;
FIGS. 13A and 13B are diagrams for explaining rules for configuring a search space according to Embodiment 2 of the claimed invention;
FIGS. 15A and 15B are diagrams for explaining rules for configuring a search space according to Embodiment 3 of the claimed invention.

DETAILED DESCRIPTION

Figure 1:
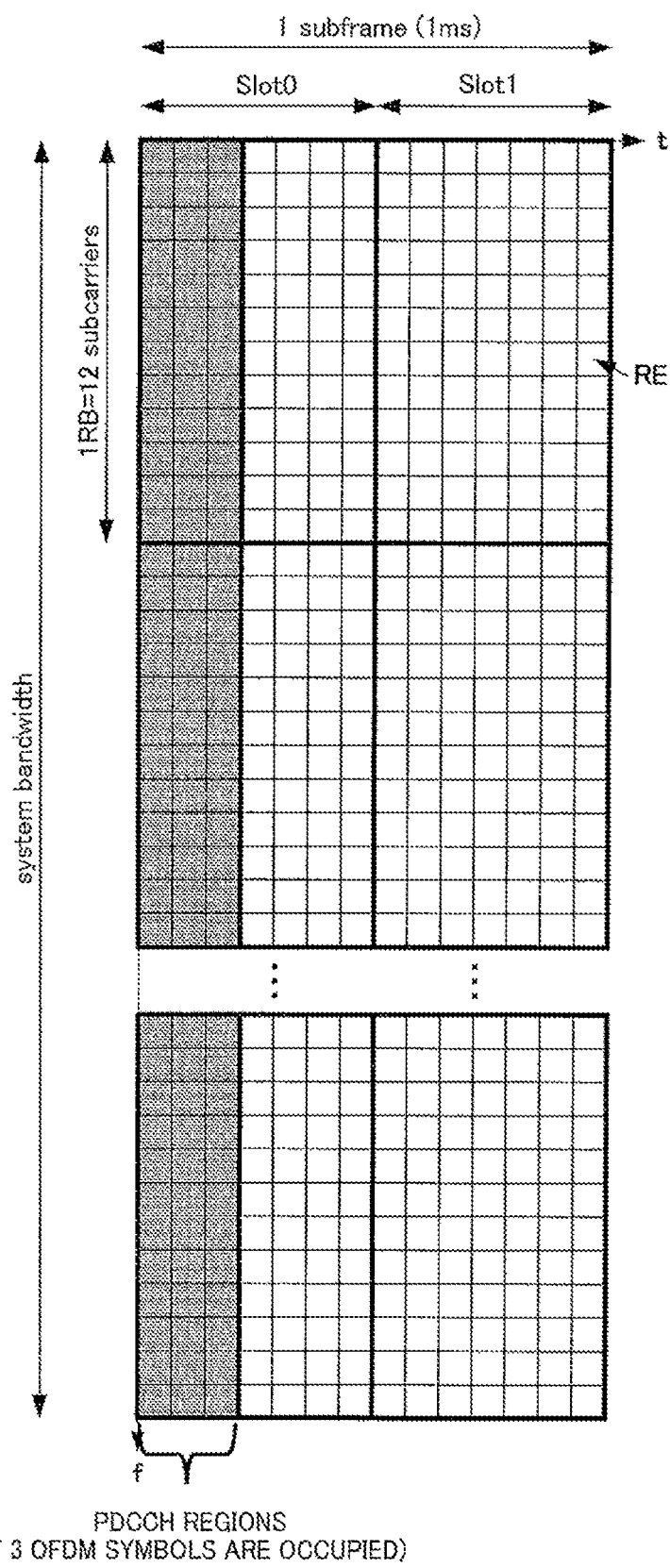
FIG. 1 illustrates an example PDCCH region.

Embodiments of the claimed invention will be described in detail with reference to the accompanying drawings. In the embodiments, the same reference numerals are used for denoting the same components, and a redundant description thereof is omitted.

(Embodiment 1)
(System Overview)

A communication system according to Embodiment 1 of the claimed invention includes base station 100 and terminal 200. Base station 100 is an LTE-A base station, and terminal 200 is an LTE-A terminal.

Figure 7:
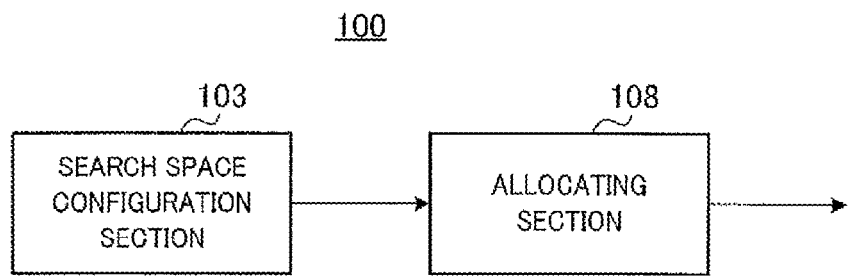
FIG. 7 is a principal block diagram of a base station according to Embodiment 1 of the claimed invention.

FIG. 7 is a principal block diagram of base station 100 according to Embodiment 1 of the claimed invention. Search space configuration section 103 of base station 100 configures a search space defined by a plurality of unit region candidates targeted for decoding in terminal 200, each of the candidates being composed of one or more CCEs. Allocating section 108 allocates a control channel in any one of the candidates targeted for decoding which are included in the configured search space. In other words, allocating section 108 allocates DCI in any one of the unit region candidates targeted for decoding which are included in the configured search space. As a result, the control channel allocated in the unit region candidate targeted for decoding (i.e., DCI to be transmitted through the control channel) is transmitted to terminal 200.

Figure 8:
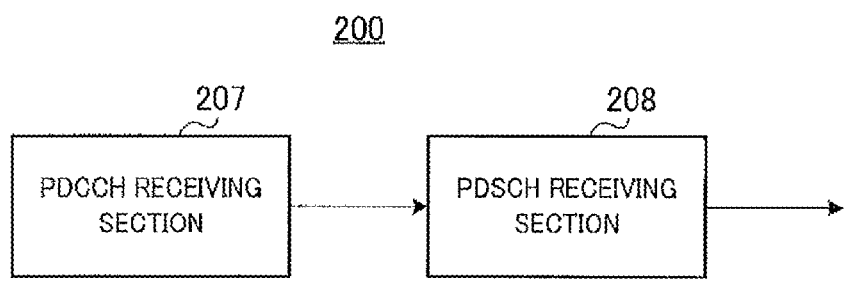
FIG. 8 is a principal block diagram of a terminal according to Embodiment 1 of the claimed invention.

FIG. 8 is a principal block diagram of terminal 200 according to Embodiment 1 of the claimed invention. In terminal 200, PDCCH receiving section 207 receives the control channel in the search space defined by a plurality of candidates targeted for decoding, each of the candidates being composed of one or more CCEs. Terminal 200 then decodes the control channel allocated in any one of the candidates targeted for decoding and directed to the device. PDSCH receiving section 208 receives downlink data signals on the basis of the DCI allocated in any one of the unit region candidates targeted for decoding and directed to the device.

(Configuration of Base Station 100)

Figure 9:
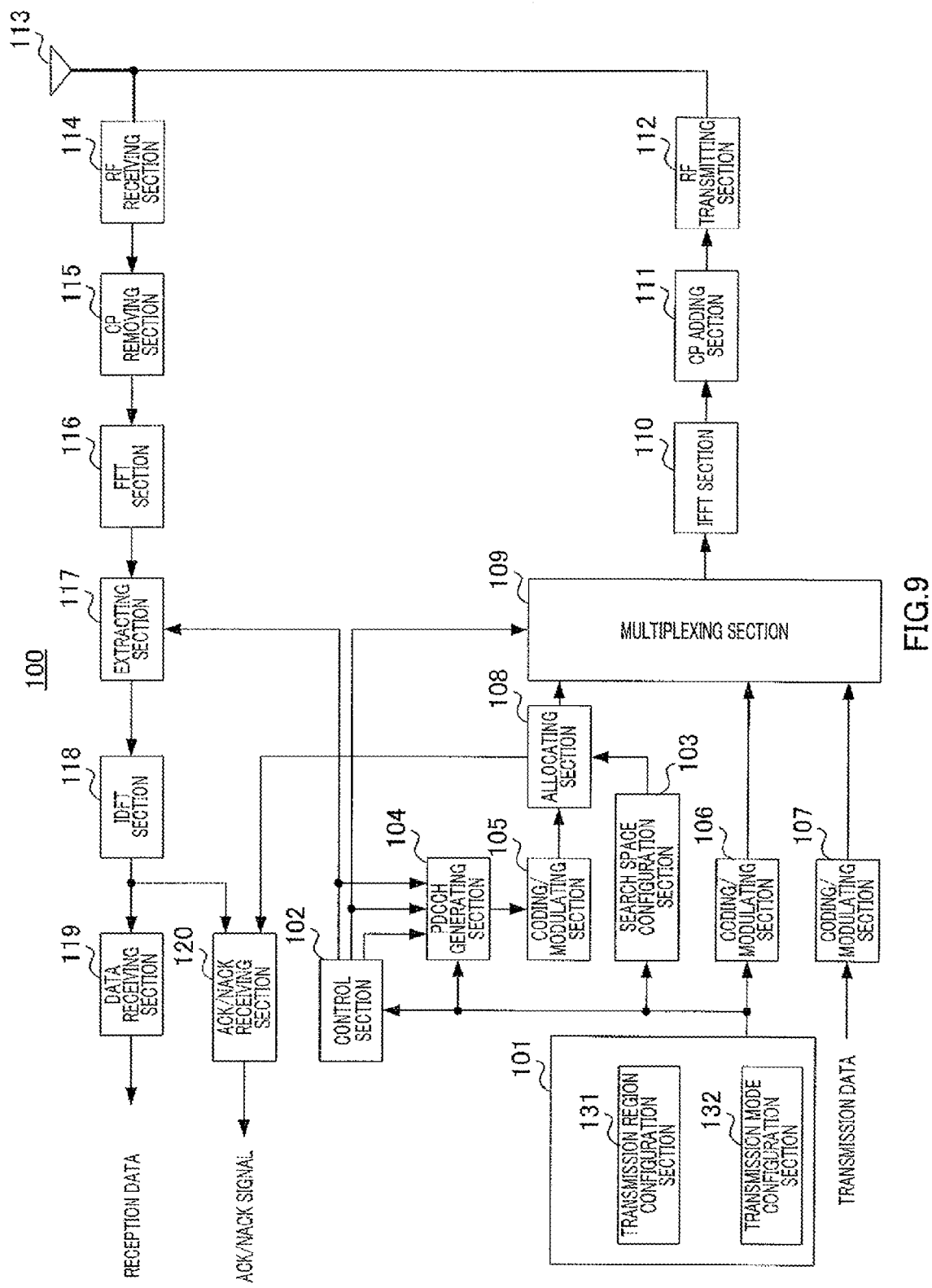
FIG. 9 is a block diagram illustrating the configuration of the base station according to Embodiment 1 of the claimed invention.

FIG. 9 is a block diagram illustrating the configuration of base station 100 according to Embodiment 1 of the claimed invention. In FIG. 9, base station 100 includes configuration section 101, control section 102, search space configuration section 103, PDCCH generating section 104, coding/modulating sections 105, 106 and 107, allocating section 108, multiplexing section 109, inverse fast Fourier transform (IFFT) section 110, cyclic prefix (CP) adding section 111, RF transmitting section 112, antenna 113, RF receiving section 114, CP removing section 115, fast Fourier transform (FFT) section 116, extracting section 117, inverse discrete Fourier transform (IDFT) section 118, data receiving section 119, and ACK/NACK receiving section 120.

Configuration section 101 configures a resource region for use in the transmission of DCI to terminal 200 and also configures each transmission mode for uplink and downlink for terminal 200. The configuration of a resource region and a transmission mode is performed for each terminal 200 to be configured. Configuration information about a resource region and a transmission mode is sent to control section 102, search space configuration section 103, PDCCH generating section 104, and coding/modulating section 106.

Specifically, configuration section 101 includes transmission region configuration section 131 and transmission mode configuration section 132.

Transmission region configuration section 131 configures a resource region for use in the transmission of DCI to terminal 200. Candidates of the resource regions to be configured include a PDCCH region and an R-PDCCH region. For example, normally, a PDCCH region is configured for terminal 200, and a large number of terminals 200 communicate under the control of base station 100. Accordingly, if the allocation of PDCCH region is expected to be tight or if it is determined that significant interference occurs in the PDCCH region, then a region including an R-PDCCH region is configured for terminal 200.

In other words, transmission region configuration section 131 determines whether blind decoding is performed, for each terminal, on only a PDCCH region or on both a PDCCH region and an R-PDCCH region (or only on an R-PDCCH region). For example, no interference control is needed for terminal 200 located around the center of a cell covered by base station 100 (i.e., there is no need for considering interference from another cell) and an SINR in a PDCCH resource is high. Accordingly, transmission region configuration section 131 configures only an R-PDCCH region for terminal 200. In contrast, interference control is needed for terminal 200 at an edge of the cell covered by base station 100 (i.e., there is need for considering interference from another cell), and the number of required resources in a PDCCH region where no beamforming effect is obtained becomes greater, transmission region configuration section 131 preferentially configures an R-PDCCH region (a beamforming effect can be obtained) for that terminal. In this manner, base station 100 optimizes the usage efficiency of a PDCCH resource and an R-PDCCH resource used by base station 100.

Transmission mode configuration section 132 configures the transmission mode (for example, spatial multiplexing MIMO transmission, beamforming transmission, and non-consecutive band allocation) of each of uplink and downlink for terminal 200.

Configuration information about a resource region and a transmission mode is reported to each terminal 200 via coding/modulating section 106 as upper-layer control information (RRC control information or RRC signaling).

Control section 102 generates allocation control information including MCS information, resource (i.e., RB) allocation information, and a new data indicator (NDI). As the resource allocation information, control section 102 generates uplink resource allocation information indicating an uplink resource (for example, a Physical Uplink Shared Channel (PUSCH)) to which uplink data from terminal 200 is allocated, or downlink resource allocation information indicating a downlink resource (for example, a Physical Downlink Shared Channel (PDSCH)) to which downlink data to terminal 200 is allocated.

Furthermore, on the basis of configuration information received from configuration section 101, control section 102 generates, for each terminal 200, allocation control information based on a transmission mode of the uplink for terminal 200 (i.e., any one of DCI 0A and DCI 0B), allocation control information (any one of DCI 1, DCI 1B, DCI 1D, DCI 2, and DCI 2A) based on a transmission mode of the downlink, or allocation control information (DCI 0/1A) common to all the terminals.

For example, in order to improve throughput during normal data transmission, control section 102 generates allocation control information (any one of DCI 1, DCI 1B, DCI 1D, DCI 2, DCI 2A, DCI 0A, and DCI 0B) depending on the transmission mode of each terminal 200 so as to allow data transmission at a transmission mode configured for each terminal 200. As a result, data can be transmitted at the transmission mode configured for each terminal 200, which improves throughput.

However, an abrupt change in the condition of a propagation path or a change in interference from an adjacent cell may cause frequent errors in receiving data at the transmission mode configured for each terminal 200. In this case, control section 102 generates allocation control information in the format (DCI 0/1A) common to all the terminals and transmits data at a robust default transmission mode. As a result, robust data transmission is allowed even if a propagation environment is abruptly changed.

Also, when upper-layer control information (i.e., RRC signaling) is transmitted for the notification of a transmission mode change under deteriorated conditions of a propagation path, control section 102 generates allocation control information (i.e., DCI 0/1A) common to all the terminals and transmits the information using the default transmission mode. The number of information bits of DCI 0/1A common to all the terminals is smaller than that of DCI 1, DCI 2, DCI 2A, DCI 0A, and DCI 0B depending on a particular transmission mode. For this reason, if the same number of CCEs is set, DCI 0/1A can allow transmission at a lower coding rate than that related to DCI 1, DCI 2, DCI 2A, DCI 0A, and DCI 0B. Thus, use of DCI 0/1A in control section 102 under a deteriorated condition of a propagation path enables a terminal having a poor condition of a propagation path to receive allocation control information (and data) with a low error rate.

Control section 102 also generates allocation control information for a common channel (for example, DCI 1C and 1A) for the allocation of data common to a plurality of terminals, such as broadcasting and paging information, in addition to the allocation control information for the allocation of terminal-specific data.

Control section 102 outputs MCS information and an NDI to PDCCH generating section 104, uplink resource allocation information to PDCCH generating section 104 and extracting section 117, and downlink resource allocation information to PDCCH generating section 104 and multiplexing section 109, among the generated items of allocation control information for the allocation of terminal-specific data. Control section 102 also outputs the generated allocation control information for a common channel to PDCCH generating section 104.

Search space configuration section 103 configures a search space on the basis of a rule for configuring a search space associated with the configured resource region indicated by configuration information received from configuration section 101. Each rule for configuring a search space is stored as a table in memory included in search space configuration section 103. A search space includes a common search space (C-SS) and a unique search space (UE-SS) as described above. The common search space (C-SS) is a search space common to all the terminals, and the unique search space (UE-SS) is a search space specific to each terminal as described above.

Specifically, search space configuration section 103 configures prepared CCEs (for example, CCEs from leading to 16th ones) as a C-SS. A CCE is a basic unit.

Search space configuration section 103 also configures a UE-SS for each terminal. For example, search space configuration section 103 determines a UE-SS for a certain terminal on the basis of the ID of the terminal, a CCE number obtained by calculations using a hash function for randomization, and the number of CCEs (L) that form a search space.

Figure 2:
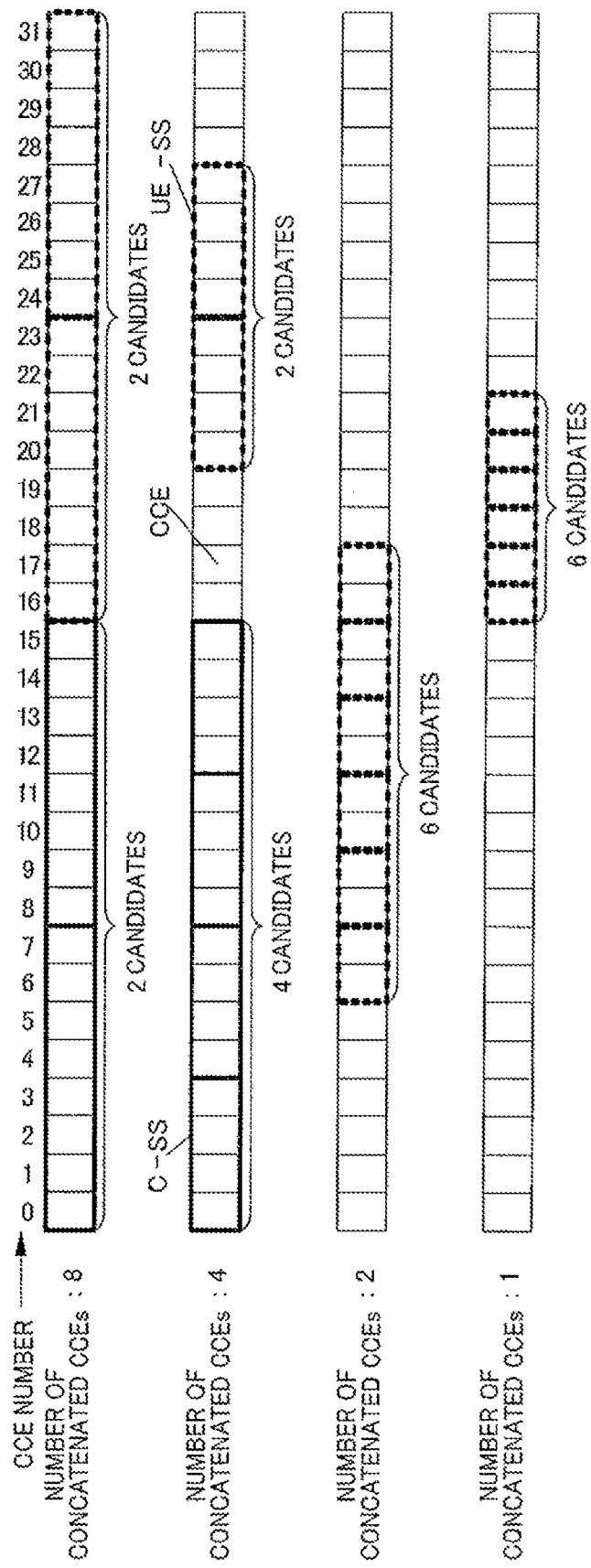
FIG. 2 is a diagram for explaining search spaces.
Figure 4:
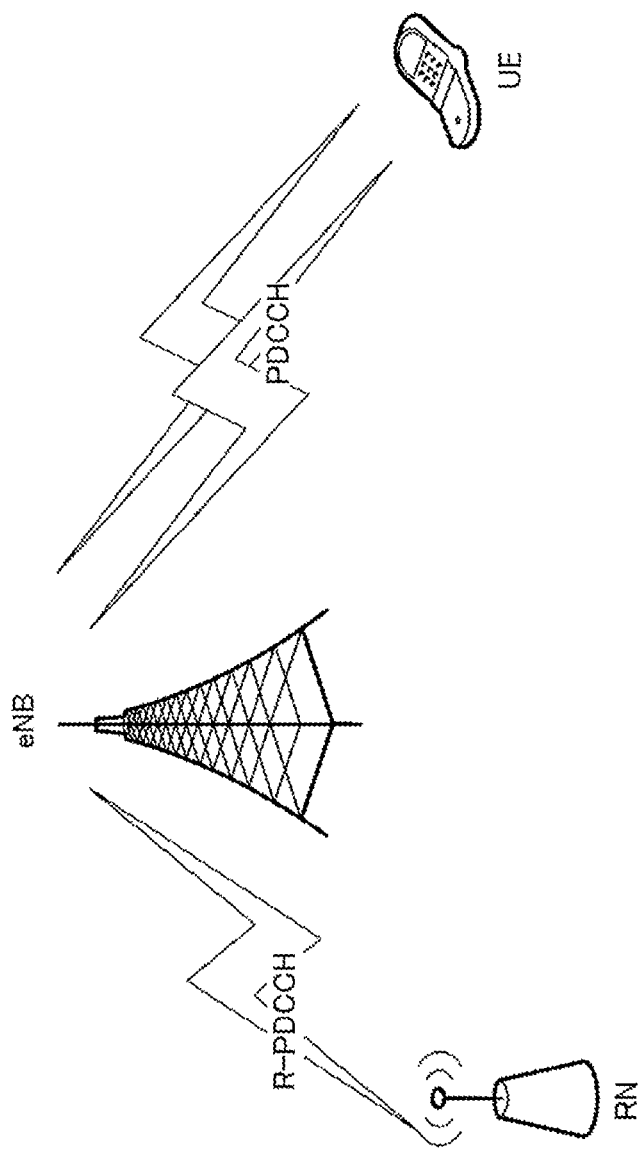
FIG. 4 is a diagram for explaining a communication system including a radio communication relay apparatus.
Figure 5:
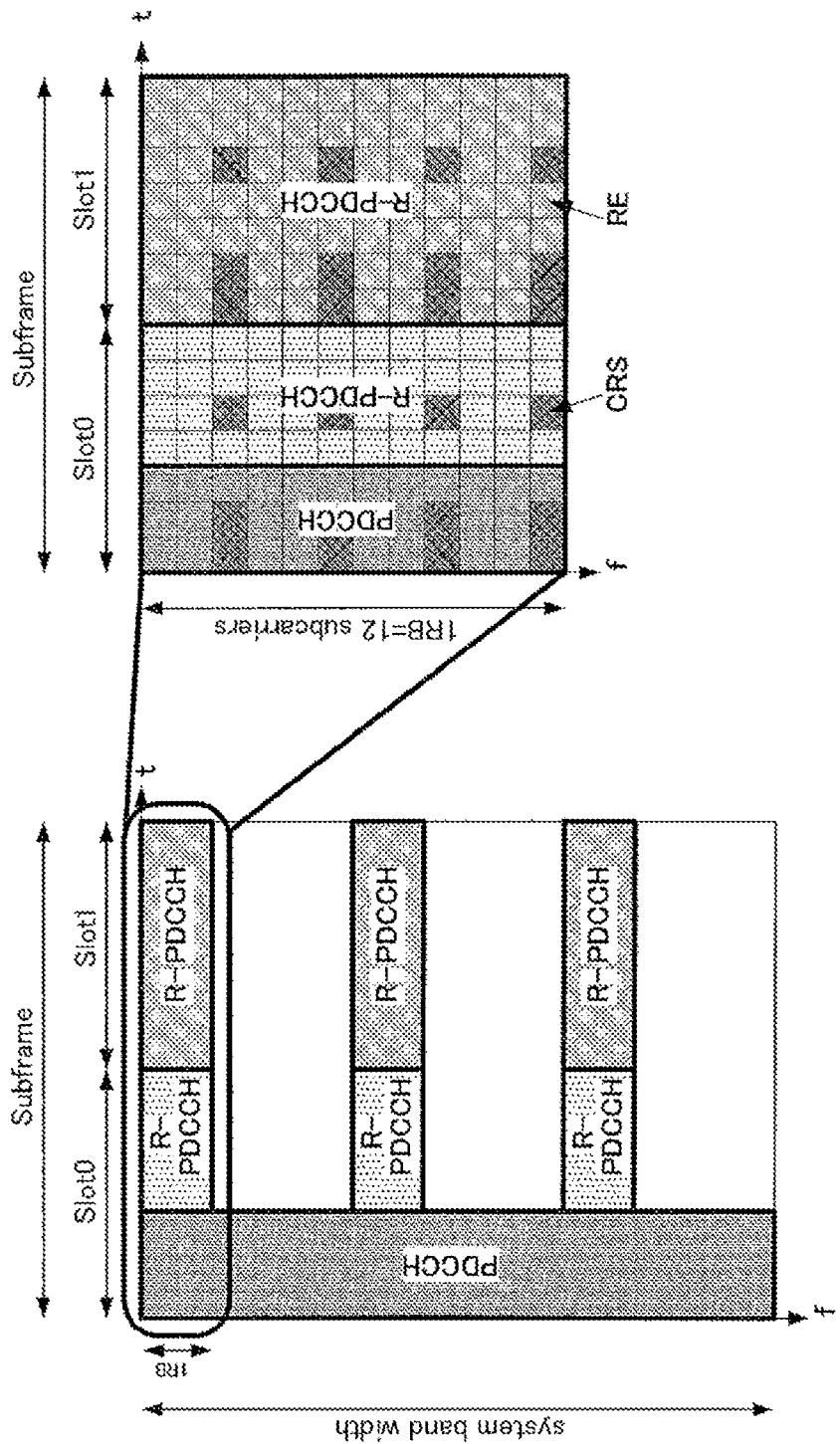
FIG. 5 illustrates an example of R-PDCCH regions.
Figure 6:
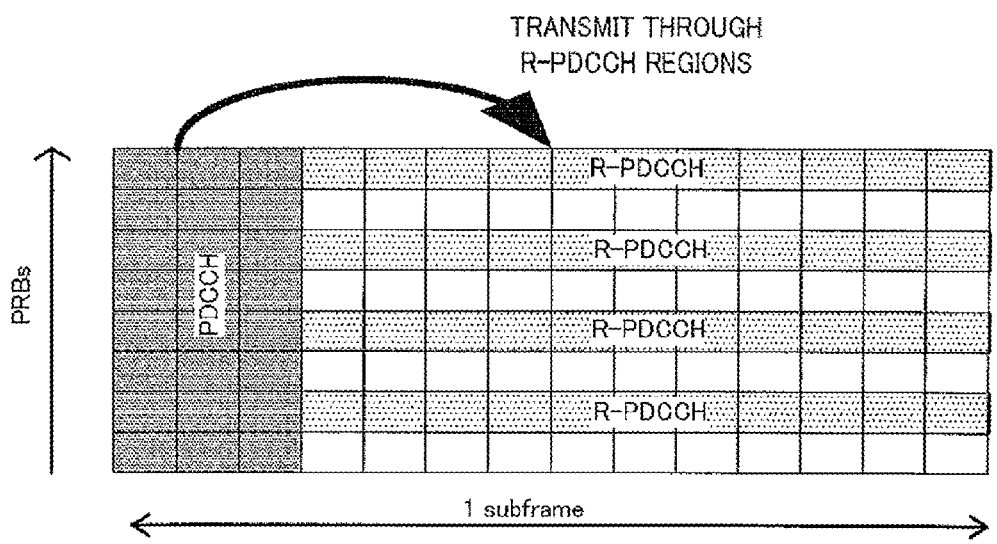
FIG. 6 is a diagram for explaining a mapping example of a PDCCH.

If a resource region configured by configuration section 101 is a PDCCH region, search space configuration section 103 configures a search space as shown in FIG. 2, for example. In other words, a pattern of the number of DCI allocation region candidates with respect to the number of concatenated CCEs in the search spaces shown in FIG. 2 is a rule for configuring a search space if a resource region configured by configuration section 101 is a PDCCH region.

In FIG. 2, with respect to four concatenated CCEs of a PDCCH, four DCI allocation region candidates (i.e., CCEs 0 to 3, CCEs 4 to 7, CCEs 8 to 11, and CCEs 12 to 15) are configured as a C-SS. Also, with respect to eight concatenated CCEs of the PDCCH, two DCI allocation region candidates (i.e., CCEs 0 to 7 and CCEs 8 to 15) are configured as another C-SS. In other words, in FIG. 2, the six DCI allocation region candidates in total are configured as the C-SSes.

Furthermore, in FIG. 2, with respect to one concatenated CCE, six DCI allocation region candidates (i.e., each of CCEs 16 to 21) are configured as a UE-SS. With respect to two concatenated CCEs, six DCI allocation region candidates (i.e., obtained by partitioning CCE 6 to 17 into six parts) are configured as another UE-SS. With respect to four concatenated CCEs, two DCI allocation region candidates (i.e., CCEs 20 to 23 and CCEs 24 to 27) are configured as yet another UE-SS. With respect to eight concatenated CCEs, two DCI allocation region candidates (i.e., CCEs 16 to 23 and CCEs 24 to 31) are configured as still another UE-SS. In other words, in FIG. 2, 16 DCI allocation region candidates in total are configured as the UE-SSes.

Also, if resource regions configured by configuration section 101 are a PDCCH region and an R-PDCCH region, search spaces are configured in accordance with a rule for configuring a search space corresponding to each of the search spaces. The rule for configuring a search space of each of the PDCCH and the R-PDCCH regions adopted in such a case will be described in detail, hereinafter.

PDCCH generating section 104 generates DCI including allocation control information received from control section 102 for the allocation of terminal-specific data (i.e., uplink resource allocation information, downlink resource allocation information, MCS information, an NDI, and/or the like for each terminal) or DCI including allocation control information for a common channel (i.e., notification information, paging information, and other information common to terminals). At this time, PDCCH generating section 104 adds CRC bits to the uplink allocation control information and the downlink allocation control information generated for each terminal and masks (or scrambles) the CRC bits with a terminal ID. PDCCH generating section 104 then outputs the masked signals to coding/modulating section 105.

Coding/modulating section 105 modulates the DCI received from PDCCH generating section 104 after channel coding and outputs the modulated signals to allocating section 108. Coding/modulating section 105 determines a coding rate set on the basis of channel quality indicator (CQI) information reported from each terminal so as to achieve a sufficient reception quality in each terminal. For example, as a distance between a terminal and a cell boundary decreases (i.e., as the channel quality of a terminal deteriorates), the coding rate to be set by coding/modulating section 105 decreases.

Allocating section 108 receives, from coding/modulating section 105, DCI including allocation control information for a common channel and DCI including allocation control information for the allocation of terminal-specific data to each terminal. Then, allocating section 108 allocates the received DCI to each of CCEs or R-CCEs in a C-SS and CCEs or R-CCEs in a UE-SS for each terminal in accordance with search space information received from search space configuration section 103.

For example, allocating section 108 selects one DCI allocation region candidate from a group of DCI allocation region candidates in a C-SS (for example, see FIG. 2). Allocating section 108 then allocates DCI including allocation control information for a common channel to a CCE (or an R-CCE; hereinafter, sometimes simply referred to as "CCE" without distinguishing "CCE" from "R-CCE") in the selected DCI allocation region candidate.

In the case of a DCI format specific to the terminal (for example, DCI 1, DCI 1B, DCI 1D, DCI 2, DCI 2A, DCI 0A, or DCI 0B), allocating section 108 allocates a CCE in a UE-SS configured for the terminal to DCI. On the other hand, in the case of a DCI format common to all the terminals (for example, DCI 0/1A), allocating section 108 allocates a CCE in a C-SS or a CCE in a UE-SS configured for the terminal to DCI.

The number of concatenated CCEs to be allocated to one DCI item depends on the coding rate and the number of DCI bits (namely, the amount of allocation control information). For example, more physical resources are required for a coding rate set to be low of DCI for a terminal located around a cell boundary. For this reason, allocating section 108 allocates more CCEs to DCI for a terminal located around a cell boundary.

Allocating section 108 then outputs information about the CCEs allocated to the DCI to multiplexing section 109 and ACK/NACK receiving section 120. Allocating section 108 outputs the coded/modulated DCI to multiplexing section 109.

Coding/modulating section 106 modulates the information received from configuration section 101 after channel coding and outputs the modulated information to multiplexing section 109.

Coding/modulating section 107 modulates the input transmission data (downlink data) after channel coding and outputs the modulated transmission data signals to multiplexing section 109.

Multiplexing section 109 multiplexes the coded/modulated DCI received from allocating section 108, the configuration information received from coding/modulating section 106, and the data signals (namely, PDSCH signals) input from coding/modulating section 107 in the time domain and the frequency domain. Multiplexing section 109 maps the PDCCH signals and the data signals (PDSCH signals) on the basis of the downlink resource allocation information received from control section 102. Multiplexing section 109 may also map the configuration information onto the PDSCH. Multiplexing section 109 then outputs the multiplexed signals to IFFT section 110.

IFFT section 110 converts the multiplexed signals from multiplexing section 109 for each antenna into a time waveform. CP adding section 111 adds a CP to the time waveform to obtain OFDM signals.

RF transmitting section 112 performs radio processing for transmission (for example, up-conversion or digital-analog (D/A) conversion) on the OFDM signals input from CP adding section 111 and transmits the resultant signals via antenna 113.

RF receiving section 114 also performs radio processing for reception (for example, down-conversion or analog-digital (A/D) conversion) on radio signals received via antenna 113 at a receiving band and outputs the resultant received signals to CP removing section 115.

CP removing section 115 removes the CP from the received signals and fast Fourier transform (FFT) section 116 converts the received signals from which the CP is removed into frequency domain signals.

Extracting section 117 extracts uplink data from the frequency domain signals received from FFT section 116 on the basis of uplink resource allocation information received from control section 102. IDFT section 118 converts the extracted signals into time domain signals and outputs the time domain signals to data receiving section 119 and ACK/NACK receiving section 120.

Data receiving section 119 decodes the time domain signals input from IDFT section 118. Data receiving section 119 then outputs decoded uplink data as received data.

ACK/NACK receiving section 120 extracts, from the time domain signals received from IDFT section 118, ACK/NACK signals from each terminal for the downlink data (PDSCH signals). Specifically, ACK/NACK receiving section 120 extracts the ACK/NACK signals from an uplink control channel (e.g., a Physical Uplink Control Channel (PUCCH) on the basis of the information received from allocating section 108. The uplink control channel is associated with the CCEs used for the transmission of the downlink allocation control information corresponding to the downlink data.

ACK/NACK receiving section 120 then determines the ACK or NACK of the extracted ACK/NACK signals.

One reason that the CCEs and the PUCCH are associated with each other is to obviate the need for signaling sent by the base station to notify each terminal of a PUCCH for use in transmitting ACK/NACK signals from the terminal, which thereby allows downlink communication resources to be efficiently used. Consequently, in accordance with the association between the CCEs and the PUCCH, each terminal determines a PUCCH for use in transmitting ACK/NACK signals on the basis of the CCEs to which downlink allocation control information (DCI) for the terminal is mapped.

(Configuration of Terminal 200)

Figure 10:
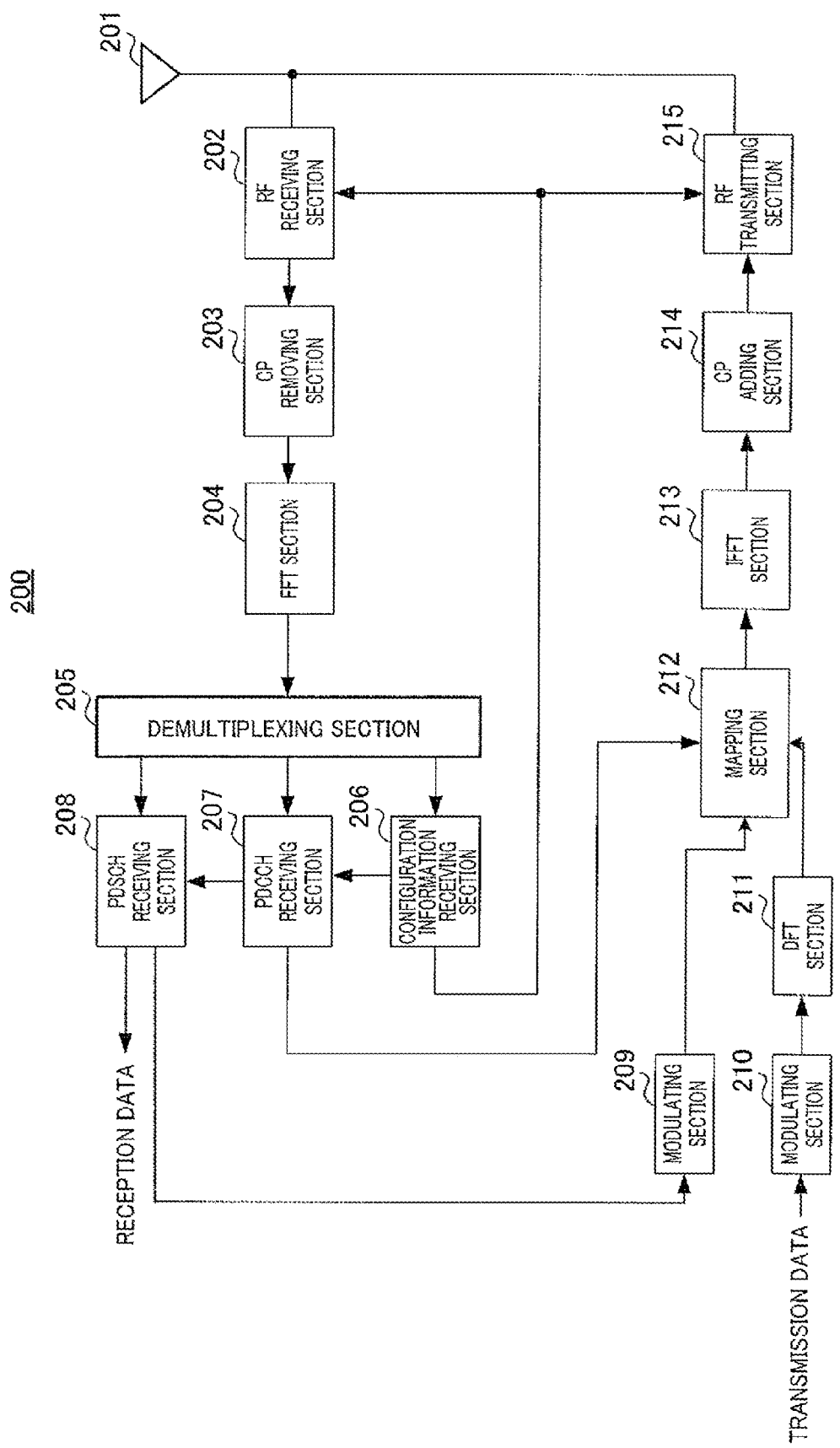
FIG. 10 is a block diagram illustrating the configuration of the terminal according to Embodiment 1 of the claimed invention.

FIG. 10 is a block diagram illustrating the configuration of terminal 200 according to Embodiment 1 of the claimed invention. Terminal 200 is an LTE-A terminal, receives data signals (i.e., downlink data) through a plurality of downlink unit carriers, and transmits ACK/NACK signals for the data signals to base station 100 via a PUCCH for one uplink unit carrier.

In FIG. 10, terminal 200 includes antenna 201, RF receiving section 202, CP removing section 203, FFT section 204, demultiplexing section 205, configuration information receiving section 206, PDCCH receiving section 207, PDSCH receiving section 208, modulating sections 209 and 210, DFT section 211, mapping section 212, IFFT section 213, CP adding section 214, and RF transmitting section 215.

RF reception section 202 sets a reception band on the basis of band information received from configuration information receiving section 206. RF reception section 202 performs radio processing for reception (e.g., down-conversion or analog-digital (A/D) conversion) on radio signals (i.e., OFDM signals in this case) received via antenna 201 at the reception band and outputs resultant received signals to CP removing section 203. The received signals may include a PDSCH signal, DCI, and upper layer control information including configuration information. The DCI (allocation control information) is allocated to a common search space (C-SS) configured for terminal 200 and other terminals or to a unique search space (UE-SS) configured for terminal 200.

CP removing section 203 removes a CP from the received signals and FFT section 204 converts the received signals from which the CP is removed into frequency domain signals. The frequency domain signals are output to demultiplexing section 205.

Demultiplexing section 205 outputs a component of signals received from FFT section 204 (i.e., signals extracted from a PDCCH region and an R-PDCCH region) that may include DCI to PDCCH receiving section 207. Demultiplexing section 205 also outputs upper layer control signals (e.g., RRC signaling) including configuration information to configuration information receiving section 206 and data signals (i.e., PDSCH signals) to PDSCH receiving section 208. If the upper layer control signals including the configuration information are transmitted through a PDSCH, demultiplexing section 205 extracts the configuration information from the signals received by PDSCH receiving section 208.

Configuration information receiving section 206 reads the following information from the upper layer control signals received by demultiplexing section 205. In other words, the information to be read includes: information indicating uplink and downlink unit carriers set for the terminal, information indicating a terminal ID set for the terminal, information indicating a resource region configured for the terminal for use in transmitting DCI, information indicating a reference signal set for the terminal, and information indicating a transmission mode configured for the terminal.

The information indicating uplink and downlink unit carriers set for the terminal is output to PDCCH receiving section 207, RF receiving section 202 and RF transmitting section 215 as band information. The information indicating a terminal ID set for the terminal is output to PDCCH receiving section 207 as terminal ID information. The information indicating a resource region for use in transmitting DCI is output to PDCCH receiving section 207 as search space region information. The information indicating a reference signal set for the terminal is output to PDCCH receiving section 207 as reference signal information. The information indicating a transmission mode configured for the terminal is output to PDCCH receiving section 207 as transmission mode information.

PDCCH receiving section 207 blind-decodes (monitors) the signals input from demultiplexing section 205 to obtain DCI for the terminal. The blind decoding is performed on a unit region candidates targeted for decoding, specified in the rule for configuring a search space associated with a resource region configured for the terminal. Each rule for configuring a search space is saved as a table in memory included in PDCCH receiving section 207. PDCCH receiving section 207 performs blind-decoding for a DCI format for the allocation of data common to all the terminals (for example, DCI 0/1A), a DCI format dependent on the transmission mode configured for the terminal (for example, DCI 1, DCI 2, DCI 2A, DCI 0A, and DCI 0B), and a DCI format for the allocation of channels common to all the terminals (for example, DCI 1C and DCI 1A). This operation creates DCI including allocation control information on the DCI formats.

If a region indicated by search space region information received from configuration information receiving section 206 is only a PDCCH region, PDCCH receiving section 207 blind-decoding for a C-SS in the DCI formats for common channel allocation (DCI 1C and DCI 1A) and the DCI format for the allocation of data common to all the terminals (DCI 0/1A) on the basis of the rule for configuring a search space in the case of a resource region being only a PDCCH region. Specifically, for each unit region candidate targeted for decoding in a C-SS (i.e., candidates of a CCE region allocated to terminal 200), PDCCH receiving section 207 demodulates and decodes the size of the DCI format for common channel allocation and the size of the DCI format for the allocation of data common to all the terminals. For the decoded signals, PDCCH receiving section 207 demasks CRC bits with an ID common to a plurality of terminals. PDCCH receiving section 207 then determines signals for which "CRC=OK" is found (i.e., no error is found) as a result of the demasking to be DCI including allocation control information for a common channel. For the decoded signals, PDCCH receiving section 207 further demasks the CRC bits with the ID of the terminal indicated by the terminal ID information. PDCCH receiving section 207 then determines signals for which "CRC=OK" is found (i.e., no error is found) as a result of the demasking to be DCI including allocation control information for the terminal. In other words, PDCCH receiving section 207 determines, in a C-SS, whether allocation control information on DCI 0/1A is for a common channel or for the allocation of data to the terminal with a terminal ID (i.e., an ID common to a plurality of terminals or the ID of terminal 200).

PDCCH receiving section 207 calculates a UE-SS for the terminal for each number of concatenated CCEs with the terminal ID indicated by the terminal ID information received from configuration information receiving section 206. For each blind decoding region candidate in the obtained UE-SS, PDCCH receiving section 207 then demodulates and decodes the size of the DCI format corresponding to the transmission mode configured for the terminal (the transmission mode indicated by the transmission mode information) and the size of the DCI format common to all the terminals (DCI 0/1A). For the decoded signals, PDCCH receiving section 207 demasks CRC bits with the ID of the terminal. PDCCH receiving section 207 determines signals for which "CRC=OK" is found (i.e., no error is found) as a result of demasking to be DCI for the terminal.

Even if regions indicated by the search space region information received from configuration information receiving section 206 are PDCCH and R-PDCCH regions, PDCCH receiving section 207 also performs blind-decoding on the basis of the rule for configuring a search space corresponding to each of the regions. The rule for configuring a search space for a PDCCH region and the rule for configuring a search space for an R-PDCCH region which are used when the regions indicated by the search space region information are a PDCCH region and an R-PDCCH region will be described in detail, hereinafter. If configuration information receiving section 206 receives no search space region information (i.e., the information about the allocation of search spaces) (i.e., if base station 100 transmits no search space region information), terminal 200 may perform blind decoding without considering the allocation of search spaces.

Upon reception of downlink allocation control information, PDCCH receiving section 207 outputs downlink resource allocation information in the DCI for the terminal to PDSCH receiving section 208. Upon reception of uplink allocation control information, PDCCH receiving section 207 outputs uplink resource allocation information to mapping section 212. PDCCH receiving section 207 also outputs the CCE number for the CCE used for the transmission of the DCI for the terminal (i.e., CCE used for the transmission of the signals for which "CRC=OK" is found) to mapping section 212 (CCE number for the leading CCE if a plurality of CCEs are concatenated). The details of blind decoding (monitoring) in the PDCCH receiving section will be described, hereinafter.

PDSCH receiving section 208 extracts received data (i.e., downlink data) from the PDSCH signals from demultiplexing section 205 on the basis of the downlink resource allocation information received from PDCCH receiving section 207. PDSCH receiving section 208 also detects any error in the extracted received data (i.e., downlink data). If an error is found in the received data as a result of the error detection, PDSCH receiving section 208 generates NACK signals as ACK/NACK signals. If no error is found in the received data, PDSCH receiving section 208 generates ACK signals as ACK/NACK signals. The ACK/NACK signals are output to modulating section 209.

Modulating section 209 modulates the ACK/NACK signals received from PDSCH receiving section 208 and outputs the modulated ACK/NACK signals to mapping section 212.

Modulating section 210 modulates transmission data (i.e., uplink data) and outputs the modulated data signal to DFT section 211.

DFT section 211 converts the data signals received from modulating section 210 into the frequency domain and outputs a plurality of resultant frequency components to mapping section 212.

Mapping section 212 maps the frequency components received from DFT section 211 to a PUSCH included in the uplink unit carrier in accordance with the uplink resource allocation information received from PDCCH receiving section 207. Mapping section 212 also identifies a PUCCH in accordance with the CCE number received from PDCCH receiving section 207. Mapping section 212 then maps the ACK/NACK signals input from modulating section 209 to the identified PUCCH.

IFFT section 213 converts the plurality of frequency components mapped to the PUSCH into a time domain waveform. CP adding section 214 adds a CP to the time domain waveform.

RF transmitting section 215 can vary the range for transmission. RF transmitting section 215 determines a specific transmission range on the basis of the band information received from configuration information receiving section 206. RF transmitting section 215 then performs transmission radio processing (for example, up-conversion or digital-analog (D/A) conversion) on the CP-added signals and transmits the resultant signals via antenna 201.

(Operations of Base Station 100 and Terminal 200)

Configuration section 101 of base station 100 configures a resource region used for the transmission of DCI for terminal 200. Candidates of the resource region to be configured include a PDCCH region and an R-PDCCH region. The resource region to be configured in one subframe may consist of only a PDCCH region or may be both a PDCCH region and an R-PDCCH region.

Search space configuration section 103 configures a search space on the basis of the rule for configuring a search space associated with the configured resource region indicated by configuration information received from configuration section 101.

Hereinafter, in a UE-SS configured for each terminal 200 in one subframe, the total number of unit region candidates targeted for decoding with respect to the number of concatenated CCEs (L=1, 2, 4, 8) for every DCI format is 16 regardless of a resource region configured by configuration section 101.

Terminal 200 (i.e., PDCCH receiving section 207) also performs blind-decoding for a UE-SS with respect to the following three DCI formats: DCI including allocation control information for the allocation of data common to all the terminals (e.g., DCI 0/1A), and DCI including allocation control information depending on the transmission mode configured for terminal 200 (e.g., uplink allocation control information (DCI 0A and DCI 0B) and downlink allocation control information (DCI 1, DCI 1B, DCI 1D, DCI 2, and DCI 2A)). In other words, the total number of blind decoding operations in the UE-SS configured for each terminal 200 in one subframe is 48 (=16 candidates×3) regardless of a resource region configured for configuration section 101.

For simplicity, "CCE" and "R-CCE" are referred to as simply "CCE," and the number of concatenated CCEs and the number of concatenated R-CCEs are simply referred to as "the number of concatenated CCEs" without distinguishing one from the other.

For example, with reference to FIG. 2, in the rule for configuring a search space adopted if a resource region configured in one subframe is only a PDCCH region, the pattern of the number of unit region candidates targeted for decoding for every DCI format with respect to the number of concatenated CCEs in a UE-SS includes 6, 6, 2, 2 (16 candidates in total) with respect to the number of concatenated CCEs L=1, 2, 4, 8, respectively. Specifically, terminal 200 performs blind-decoding for each of the three DCI formats in one subframe. In other words, the number of blind decoding operations by terminal 200 is 48 in total (18, 18, 6, and 6 with respect to the number of concatenated CCEs L=1, 2, 4, 8, respectively, as shown in FIG. 11A) in the rule for configuring a search space adopted if a resource region to be configured is only a PDCCH region.

In the case where resource regions configured in one subframe are a PDCCH region and an R-PDCCH region, patterns on the number of unit region candidates targeted for decoding with respect to the number of concatenated CCEs are different from each other between a "first rule for configuring a search space" adopted for the PDCCH region and a "second rule for configuring a search space" adopted for the R-PDCCH region. In other words, patterns on the number of unit region candidates targeted for decoding with respect to the number of concatenated CCEs are independently specified for the PDCCH region and the R-PDCCH region, respectively.

The first rule for configuring a search space and the second rule for configuring a search space will be described below.

For example, on the pattern of the first rule for configuring a search space (for a PDCCH region), the number of unit region candidates targeted for decoding is eight candidates in total (i.e., 2, 2, 2, 2 with respect to the number of concatenated CCEs being 1, 2, 4, 8, respectively). Specifically, in the first rule for configuring a search space, the number of blind decoding operations by terminal 200 is 24 in total (i.e., 6, 6, 6, 6 with respect to the number of concatenated CCEs L=1, 2, 4, 8, respectively, because terminal 200 performs blind-decoding for each of the three DCI formats), as shown in FIG. 11B.

For example, on the pattern of the second rule for configuring a search space (for an R-PDCCH region), the number of unit region candidates targeted for decoding is eight candidates in total (i.e., 3, 3, 1, 1 with respect to the number of concatenated CCEs being 1, 2, 4, 8, respectively). Specifically, in the second rule for configuring a search space, the number of blind decoding operations by terminal 200 is 24 operations in total (i.e., 9, 9, 3, 3 with respect to the number of concatenated CCEs L=1, 2, 4, 8, respectively), as shown in FIG. 11B.

Thus, the total number of blind decoding operations in the PDCCH region and the R-PDCCH region by terminal 200 is 48 (=24 for the PDCCH region+24 for the R-PDCCH region).

Figure 12:
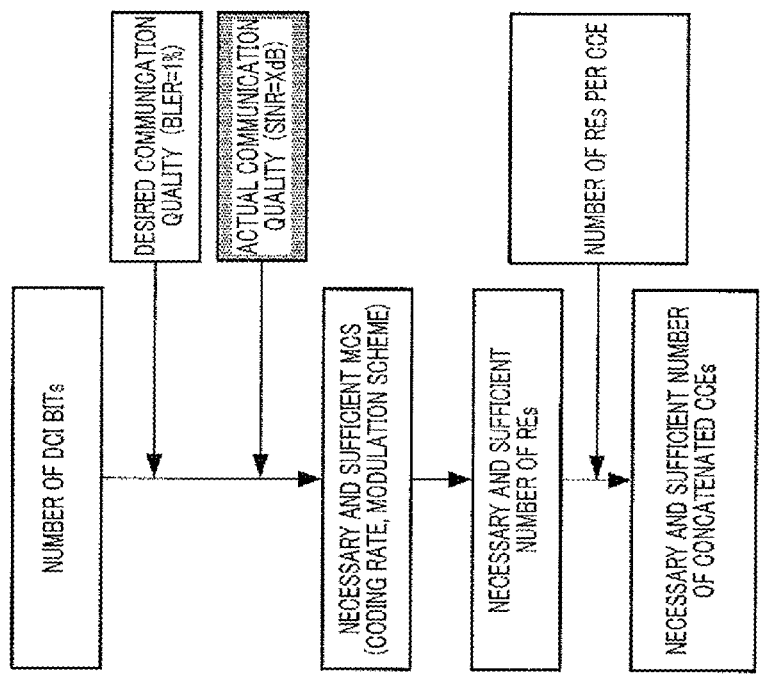
FIG. 12 is a diagram for explaining a method for calculating the necessary and sufficient number of concatenated CCEs according to Embodiment 1 of the claimed invention.

As shown in FIG. 12, base station 100 determines a necessary and sufficient MCS (i.e., a necessary and sufficient coding rate) so as to achieve necessary and sufficient communication quality (for example, in LTE, "BLER=1% or less" is specified for a PDCCH) with the number of DCI bits to be transmitted to terminal 200 being based on actual communication quality (for example, SINR=X[dB]). Base station 100 then calculates a necessary and sufficient number of REs from the number of DCI bits and the necessary and sufficient coding rate and also calculates a necessary and sufficient number of concatenated CCEs from the number of REs per CCE.

An R-PDCCH region is configured by base station 100 determining (limiting) an R-PDCCH-mapped position for each terminal 200. Thus, for example, base station 100, which configures an R-PDCCH region for terminal 200, can allocate the best frequency resource as the R-PDCCH region in consideration of a propagation path between base station 100 and terminal 200. This provides for a frequency scheduling effect in the R-PDCCH region. Furthermore, since an R-PDCCH region is configured for a specific terminal at a specific frequency band, base station 100 can perform beamforming for the specific terminal in the R-PDCCH region.

Since a PDCCH region is configured across the entire system band, a frequency diversity effect is provided for the PDCCH region. However, beamforming for a specific terminal cannot be applied to a PDCCH region in which a diversity technique is adopted for the transmission to all the terminals.

Since a PDCCH region is configured across the entire system band, the application of interference coordination between cells is challenging in the PDCCH region. In contrast, since base station 100 can determine (limit) the frequency position of an R-PDCCH region, interference coordination can be applied between cells in the R-PDCCH region. As a result, even in an environment (scenario) such as a heterogeneous network where interference easily occurs between cells, interference on which control signals (DCI) can be reduced in an R-PDCCH region compared with a PDCCH region.

Thus, interference control, frequency scheduling, and beamforming can be applied to an R-PDCCH region. Consequently, actual communication quality (transmission quality) shown in FIG. 12 is better in an R-PDCCH region than in a PDCCH region.

Thus, in FIG. 12, the total number of REs required to achieve necessary and sufficient communication quality (for example, "BLER=1%") is smaller in an R-PDCCH region than in a PDCCH region. In other words, an R-PDCCH region can achieve a desired communication quality with a smaller number of resources, namely, a smaller number of concatenated CCEs compared with a PDCCH region.

Thus, in an R-PDCCH region, which requires a smaller total number of necessary and sufficient REs, the number of blind decoding operations (the number of unit region candidates targeted for decoding) in a smaller number of concatenated CCEs is desirably increased compared with a PDCCH region.

The rules for configuring a search space shown in FIG. 11B satisfy this requirement. Specifically, the pattern of the second rule for configuring a search space has a peak (i.e., a center) of the distribution of unit region candidates targeted for decoding in a search space (i.e., the number of blind decoding operations) with respect to the number of concatenated CCEs, at a position corresponding to the smaller number of blind decoding operations, compared with the pattern of the first rule for configuring a search space shown in FIG. 11B.

The term "the pattern of the second rule for configuring a search space has the peak of the distribution of the unit region candidates targeted for decoding (the number of blind decoding operations) with respect to the number of concatenated CCEs, at a position corresponding to the smaller number of concatenated CCEs compared with the pattern of the first rule for configuring a search space" has the meaning defined below.

The weighted average of the number of concatenated CCEs with respect to the number of blind decoding operations (the number of unit region candidates targeted for decoding) for the second rule for configuring a search space (in an R-PDCCH region) is smaller than that for the first rule for configuring a search space (in a PDCCH region). The weighted average of the number of concatenated CCEs with respect to the number of blind decoding operations (the number of unit region candidates targeted for decoding) is represented by equation 1:

(Equation 1)

$$\text{Weighted average of numbers of concatenated } CCEs = \frac{\sum_{\text{numbers of concatenated } CCEs} \begin{pmatrix} (\text{numbers of concatenated } CCEs) \times \\ (\text{numbers of blind decoding operations per number of concatenated } CCEs) \end{pmatrix}}{\text{Total number of blind decoding operations}} \quad [1]$$

The satisfaction of the foregoing equation can be confirmed as follows:

The weighted average of the number of blind decoding operations for each number of concatenated CCEs for the first rule for configuring a search space shown in FIG. 11B is "(1×6+2×6+4×6+8×6)/(6+6+6+6)=3.75." The weighted average for the second rule for configuring a search space shown in FIG. 11B is "(1×9+2×9+4×3+8×3)/(9+9+3+3)=2.625." Thus, the relationship, "the first rule for configuring a search space> the second rule for configuring a search space" is satisfied.

Next, configuration of only a PDCCH region (FIG. 11A) is compared with that of both a PDCCH region and an R-PDCCH region (FIG. 11B).

The configuration of only the PDCCH region (FIG. 11A) and the configuration of the PDCCH region and the R-PDCCH region (FIG. 11B) have the same number of blind decoding operations by terminal 200 (48 operations). This means that base station 100 allocates as many unit region candidates targeted for decoding as those for terminal 200 that uses only a PDCCH region (i.e., throughput comparable to that of terminal 200 for using only a PDCCH region) to the PDCCH region and the R-PDCCH region used in terminal 200, instead of the terminal 200 using both the PDCCH region and the R-PDCCH region.

Accordingly, an increase in the number of blind decoding operations by terminal 200 (i.e., unit region candidates targeted for decoding, indicating a requirement for throughput of terminal 200 for blind decoding) can be prevented, in accordance with the case where a resource region configured in one subframe is only a PDCCH region or the case where such resource regions are both a PDCCH region and an R-PDCCH region. Accordingly, an increase in a circuit scale of terminal 200 can be prevented as well.

In the case of configuring both a PDCCH region and an R-PDCCH region (FIG. 11B), the number of blind decoding operations (i.e., number of unit region candidates targeted for decoding) with respect to the larger number of concatenated CCEs (L=4, 8) is unchanged in the PDCCH region, but the number of blind decoding operations (i.e., number of unit region candidates targeted for decoding) for the smaller number of concatenated CCEs (L=1, 2) is reduced compared with configuration of only a PDCCH region (FIG. 11A).

In contrast, in the R-PDCCH region shown in FIG. 11B, the number of blind decoding operations (i.e., number of unit region candidates targeted for decoding) for the smaller number of concatenated CCEs (L=1, 2) is larger than the number of blind decoding operations (i.e., number of unit region candidates targeted for decoding) with respect to the larger number of concatenated CCEs (L=4, 8).

In other words, in the PDCCH region, which has more deteriorated communication quality than that of the R-PDCCH region, the rule for configuring a search space shown in FIG. 11B preferentially reduces the number of blind decoding operations (i.e., number of unit region candidates targeted for decoding) for the smaller number of concatenated CCEs (L=1, 2), which is unlikely to be used for the transmission of DCI. In contrast, in the R-PDCCH region, which has better communication quality than that of the PDCCH region, the rule for configuring a search space shown in FIG. 11B preferentially increases the number of blind decoding operations (i.e., number of unit region candidates targeted for decoding) for the smaller number of concatenated CCEs (L=1, 2), which is likely to be used for the transmission of DCI. In other words, in accordance with the rule for configuring a search space shown in FIG. 11B, the number of unit region candidates targeted for decoding to be configured in the R-PDCCH region for the smaller number of concatenated CCEs (L=1, 2) is preferentially larger than that in the PDCCH region.

In this manner, the rule for configuring a search space shown in FIG. 11B configures more unit region candidates targeted for decoding (i.e., number of blind decoding operations) for the number of concatenated CCEs likely to be used for a resource region of each of the PDCCH region and the R-PDCCH region. This allows base station 100 to flexibly allocate DCI for terminal 200 to a PDCCH region and an R-PDCCH region.

As described above, in an R-PDCCH region, the number of blind decoding operations (i.e., number of unit region candidates targeted for decoding) for the smaller number of concatenated CCEs (L=1, 2) is larger than the number of blind decoding operations (i.e., number of unit region candidates targeted for decoding) with respect to the larger number of concatenated CCEs (L=4, 8). In other words, the average of the number of concatenated CCEs to be used in an R-PDCCH region may be reduced compared with a PDCCH region (i.e., weighted average of the number of concatenated CCE with respect to the number of blind decoding operations associated with the first rule for configuring a search space is larger than that associated with the second rule for configuring a search space). Thus, in an R-PDCCH region, reductions in resources used for downlink allocation control information to terminal 200 under the control of base station 100 enable for flexible resource allocation in the R-PDCCH region from base station 100 to a relay station. Accordingly, the usage efficiency of the R-PDCCH region can be improved.

Allocating section 108 allocates the DCI to unit region candidates targeted for decoding indicated by the search space information from search space configuration section 103. The DCI is then transmitted to terminal 200.

In terminal 200, PDCCH receiving section 207 performs blind decoding on the basis of the rule for configuring a search space associated with each of the case where the search space region information from configuration information receiving section 206 indicates only a PDCCH region and the case where the information indicates both a PDCCH region and an R-PDCCH region. These rules correspond to the above-described rules adopted in base station 100 (for example, see FIGS. 11A and 11B).

According to the present embodiment, search space configuration section 103 of base station 100, as described above, configures a search space defined by a plurality of unit region candidates targeted for decoding. At this time, the number of concatenated CCEs that form the unit region candidates targeted for decoding (number of concatenated CCEs) is associated with the number of unit region candidates targeted for decoding, and search space configuration section 103 varies the association between the number of concatenated CCEs that form the unit region candidates targeted for decoding (the number of concatenated CCEs) and the number of unit region candidates targeted for decoding depending on the control channel to be transmitted. Specifically, search space configuration section 103 configures a search space on the basis of a rule for configuring a search space depending on the control channel (a PDCCH and an R-PDCCH) to be configured. Furthermore, allocating section 108 allocates a control channel (namely, DCI) in any one of the unit region candidates targeted for decoding in the configured search space. A search space is composed of a plurality of unit region candidates targeted for decoding in terminal 200 and each unit region candidate targeted for decoding is composed of one or more concatenated CCEs or R-CCEs (control channel elements).

In a rule for configuring a search space, the number of unit region candidates targeted for decoding is associated with the number of concatenated CCEs. The first rule for configuring a search space in a PDCCH region and the second rule for configuring a search space in an R-PDCCH region each have a different pattern on the number of unit region candidates targeted for decoding with respect to the number of concatenated CCEs (R-CCEs). In other words, the patterns on the number of unit region candidates targeted for decoding with respect to the number of concatenated CCEs (i.e., number of concatenated R-CCEs) are independently specified for a PDCCH region and an R-PDCCH region, respectively. More specifically, the first rule for configuring a search space for a PDCCH region and the second rule for configuring a search space for an R-PDCCH region each have a different peak of the distribution of the number of unit region candidates targeted for decoding with respect to the number of concatenated CCEs.

Accordingly, DCI for terminal 200 under the control of base station 100 can be efficiently transmitted using unit region candidates targeted for decoding with respect to the number of concatenated CCEs, the candidates being prepared in accordance with the communication quality of each resource region. Furthermore, the DCI can be efficiently transmitted without an increase in the number of blind decoding operations by terminal 200 in the rules for configuring a search space using the same total number of unit region candidates targeted for decoding (i.e., same total number of blind decoding operations by terminal 200) both in the case of the transmission of DCI for terminal 200 with only a PDCCH region and the case of the transmission of DCI for terminal 200 with a PDCCH region and an R-PDCCH region.

Also, the pattern of the second rule for configuring a search space (for an R-PDCCH region, which has better communication quality) has the peak of the distribution of the unit region candidates targeted for decoding with respect to the number of concatenated CCEs, at a position corresponding to the smaller number of concatenated CCEs compared with the pattern of the first rule for configuring a search space (for a PDCCH region, which has more deteriorated communication quality). In other words, regarding the peak related to each rule for configuring a search space for a PDCCH region and an R-PDCCH region, the peak related to the rule for configuring a search space for a control channel having better communication quality corresponds to the smaller number of concatenated CCEs compared with the peak related to the rule for configuring a search space for a control channel having more deteriorated communication quality.

Accordingly, DCI in an R-PDCCH region, which has better communication quality than that of a PDCCH region, can be transmitted efficiently, because more blind decoding operations are to be performed for the necessary and sufficient number of concatenated CCEs (number of concatenated CCEs likely to be used for the transmission of DCI in the PDCCH region) in order to achieve desired communication quality. Also, in the R-PDCCH region, DCI for terminal 200 under the control of base station 100 is likely to be used through a smaller number of concatenated CCEs. This improves the usage efficiency of the R-PDCCH region, which can prevent an increase in a blocking probability.

In terminal 200, PDCCH receiving section 207 receives the control channel (namely, DCI) allocated in a search space and decodes the control channel (i.e., DCI) directed to the device, the channel being allocated in any one of the unit region candidates targeted for decoding that form the search space. In other words, PDCCH receiving section 207 monitors a plurality of unit region candidates targeted for decoding that form a search space and decodes a control channel directed to the device and allocated in any one of the candidates targeted for decoding. Specifically, PDCCH receiving section 207 configures a search space on the basis of a rule for configuring a search space and performs blind-decoding on each of the unit region candidates targeted for decoding that form the search space. Each unit region candidate targeted for decoding is composed of one or more concatenated CCEs or R-CCEs (control channel elements).

In the rules for configuring a search space, each number of unit region candidates targeted for decoding is associated with the corresponding number of concatenated CCEs. The first rule for configuring a search space for a PDCCH region and the second rule for configuring a search space for an R-PDCCH region each have different patterns on the number of unit region candidates targeted for decoding with respect to the number of concatenated CCEs. In other words, the patterns on the number of unit region candidates targeted for decoding with respect to the number of concatenated CCEs are independently specified for a PDCCH region and an R-PDCCH region, respectively.

Accordingly, DCI for terminal 200 under the control of base station 100 can be efficiently transmitted using unit region candidates targeted for decoding with respect to the number of concatenated CCEs, the candidates being prepared in accordance with communication quality of each region.

Thus, according to the present embodiment, even if DCI for a terminal under the control of a base station is transmitted using a PDCCH region and an R-PDCCH region, a decrease in flexibility of resource allocation in the base station can be prevented without an increase in the number of blind decoding operations to be performed by the terminal.

(Embodiment 2)

In Embodiment 2, the number of REs per CCE is different between a PDCCH region and an R-PDCCH region.

The basic configurations of a base station and a terminal of Embodiment 2 are common to those of Embodiment 1; hence, the configurations will be described with reference to FIGS. 9 and 10.

In base station 100 of Embodiment 2, configuration section 101 configures a resource region used for the transmission of DCI for terminal 200. Candidates to be configured as the resource region include a PDCCH region and an R-PDCCH region. A resource region configured in one subframe may consist of only a PDCCH region or may be both a PDCCH region and an R-PDCCH region.

Search space configuration section 103 configures a search space on the basis of a rule for configuring a search space associated with an configuration resource region indicated by configuration information from configuration section 101. A rule for configuring a search space for the resource region being a PDCCH region and a rule for configuring a search space for the resource region being an R-PDCCH region have different patterns on the number of unit region candidates targeted for decoding with respect to the number of concatenated CCEs if the number of REs for each of CCEs in the PDCCH and the R-PDCCH are different from each other. In other words, the patterns on the number of unit region candidates targeted for decoding (i.e., the number of blind decoding operations) with respect to the number of concatenated CCEs are independently specified for a PDCCH region and an R-PDCCH region, respectively, on the basis of the number of REs for each of CCEs in each control channel (a PDCCH and an R-PDCCH).

FIGS. 13A and 13B are diagrams for explaining rules for configuring a search space according to this embodiment. Although FIG. 13A shows a rule for configuring a search space adopted in the case where a resource region configured in one subframe is only a PDCCH region, the rule is similar to that in Embodiment 1 (FIG. 11A), and an explanation thereof will be omitted.

For simplicity, "CCE" and "R-CCE" are simply referred to as "CCE" without distinguishing them from each other, and the number of concatenated CCEs and the number of concatenated R-CCEs are simply referred to as "the number of concatenated CCEs" without distinguishing them from each other.

Hereinafter, the total number of unit region candidates targeted for decoding with respect to the number of concatenated CCEs (L=1, 2, 4, 8) for every DCI format is 16 in a UE-SS configured for each terminal 200 in one subframe, as in Embodiment 1. Also as in Embodiment 1, terminal 200 (PDCCH receiving section 207) performs blind-decoding for a UE-SS with three DCI formats. In other words, the total number of blind decoding operations in the UE-SS configured for each terminal in one subframe is 48 (=16 candidates×3) regardless of a resource region configured for configuration section 101.

A PDCCH has a larger number of REs per CCE (a larger number of REs that form a CCE) than that of an R-PDCCH. For example, the number of REs per CCE is 36 in a PDCCH region, and the number of REs per CCE is 18 in an R-PDCCH region.

In the case where resource regions configured in one subframe are a PDCCH region and an R-PDCCH region, a rule for configuring a search space adopted for a resource region including a larger number of REs per CCE and a rule adopted for a resource region including a smaller number of REs per CCE are referred to as "first rule for configuring a search space" and "second rule for configuring a search space," respectively.

The assumption in this embodiment is that the number of concatenated CCEs L=1, 2 is the necessary and sufficient number of concatenated CCEs in an R-PDCCH region (i.e., number of concatenated CCEs likely to be often used in an R-PDCCH region), as indicated in the second rule for configuring a search space (FIG. 11B) according to Embodiment 1. In this regard, the number of REs per CCE in the R-PDCCH region of Embodiment 1 is 36.

The first rule for configuring a search space and the second rule for configuring a search space will be described below.

For example, on the pattern of the first rule for configuring a search space (for a PDCCH region), the number of unit region candidates targeted for decoding are 2, 2, 2, 2 (i.e., eight candidates in total) with respect to the number of concatenated CCEs being 1, 2, 4, 8, respectively. Specifically, in the first rule for configuring a search space, the number of blind decoding operations by terminal 200 is 24 operations in total (i.e., 6, 6, 6, 6 with respect to the number of concatenated CCEs L=1, 2, 4, 8, respectively), as shown in FIG. 13B.

For example, on the pattern of the second rule for configuring a search space (for an R-PDCCH region), the number of unit region candidates targeted for decoding is eight candidates in total (i.e., 1, 3, 3, 1 with respect to the number of concatenated CCEs being 1, 2, 4, 8, respectively). Specifically, in the second rule for configuring a search space, the number of blind decoding operations by terminal 200 is 24 operations in total (3, 9, 9, 3 with respect to the number of concatenated CCEs L=1, 2, 4, 8, respectively), as shown in FIG. 13B.

Thus, the total number of blind decoding operations in the PDCCH region and the R-PDCCH region by terminal 200 is 48 (=24 for the PDCCH region+24 for the R-PDCCH region). In other words, the configuration of only the PDCCH region (FIG. 13A) and the configuration of the PDCCH region and the R-PDCCH region (FIG. 13B) have the same number of blind decoding operations by terminal 200 (48 operations), as in Embodiment 1.

Figure 14:
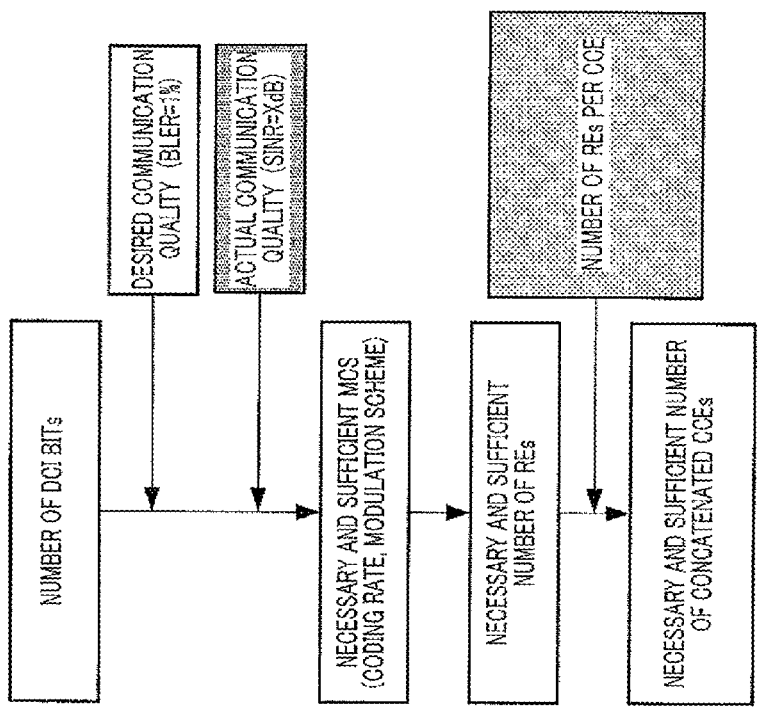
FIG. 14 is a diagram for explaining a method for calculating the necessary and sufficient number of concatenated CCEs according to Embodiment 2 of the claimed invention.

FIG. 14 shows a method for calculating the necessary and sufficient number of concatenated CCEs in base station 100, similarly to FIG. 12. As described in Embodiment 1, the actual communication quality (transmission quality) shown in FIG. 14 is better in an R-PDCCH region than in a PDCCH region. Thus, in FIG. 14, the total number of REs (=the number of concatenated CCEs×the number of REs per CCE) required to achieve necessary and sufficient communication quality (for example, "BLER=1%") is smaller in the R-PDCCH region than the PDCCH region. In other words, the R-PDCCH region can achieve a desired communication quality with the number of concatenated CCEs corresponding to a smaller total number of REs compared to a PDCCH region.

In FIG. 14, the number of REs (18) that form a CCE in the R-PDCCH region is different from the number of REs (36) that form a CCE in the PDCCH region. In other words, the PDCCH region and the R-PDCCH region each have a different total number of REs (=the number of concatenated CCEs×the number of REs per CCE) that form unit region candidates targeted for decoding associated with each number of concatenated CCEs (L=1, 2, 4 or 8).

Thus, in an R-PDCCH region, which requires a smaller total number of necessary and sufficient REs, the number of blind decoding operations (i.e., number of unit region candidates targeted for decoding) in the number of concatenated CCEs associated with a smaller total number of REs is desirably increased compared to a PDCCH region.

The rules for configuring a search space shown in FIG. 13B satisfy this requirement. Specifically, the patterns of the first rule for configuring a search space and the second rule for configuring a search space shown in FIG. 13B are determined depending on the number of REs per CCE. The pattern of the second rule for configuring a search space has a peak (i.e., a center) of the distribution of unit region candidates targeted for decoding in a search space with respect to the total number of REs that form the unit region candidates targeted for decoding associated with the number of concatenated CCEs, at a position corresponding to the smaller total number of REs, compared to the pattern of the first rule for configuring a search space.

The term "the pattern of the second rule for configuring a search space has a peak of the distribution of the unit region candidates targeted for decoding with respect to the total number of REs that form the unit region candidates targeted for decoding associated with the number of concatenated CCEs, at a position corresponding to the smaller total number of REs compared with the pattern of the first rule for configuring a search space" has the meaning defined below.

The weighted average of the total number of REs for each number of concatenated CCEs, with respect to the number of blind decoding operations (number of unit region candidates targeted for decoding) for the second rule for configuring a search space is smaller than that for the first rule for configuring a search space. The weighted average of the total number of REs for each number of concatenated CCEs, with respect to the number of blind decoding operations (i.e., number of unit region candidates targeted for decoding) is expressed by equation 2:

(Equation 2)

$$\text{Weighted average of numbers of total numbers of } REs = \frac{\sum_{\text{numbers of concatenated } CCEs} \left( \begin{array}{l} (\text{numbers of concatenated } CCEs) \times (\text{numbers of } REs \text{ per } CCE) \times \\ (\text{numbers of blind decoding operations per number of concatenated } CCEs) \end{array} \right)}{\text{Total number of blind decoding operations}} \quad [2]$$

The number of REs per CCE is 36 in a PDCCH region and is 18 in an R-PDCCH region; hence, whether or not the aforementioned matter is satisfied can be confirmed in the following manner.

The weighted average of the total number of REs for each number of concatenated CCEs with respect to the number of blind decoding operations for the first rule for configuring a search space shown in FIG. 13B is "(1×36×6+2×36×6+4×36×6+8×36×6)/(6+6+6+6)=135." The weighted average for the second rule for configuring a search space shown in FIG. 13B is "(1×18×3+2×18×9+4×18×9+8×18×3)/(3+9+9+3)= 60.75." Thus, the relationship, "the first rule for configuring a search space> the second rule for configuring a search space" is satisfied.

The second rule for configuring a search space (FIG. 11B) used in the R-PDCCH region in Embodiment 1 is now compared with the second rule for configuring a search space (FIG. 13B) used in the R-PDCCH region in Embodiment 2.

In FIG. 11B (number of REs per CCE=36), the total number of REs (=the number of concatenated CCEs×the number of REs per CCE) with respect to the number of concatenated CCEs (L=1, 2, 4) in the R-PDCCH region is 36 (=1×36), 72 (=2×36), and 144 (=4×36), respectively. In FIG. 13B (the number of REs per CCE=18), the total number of REs with respect to the number of concatenated CCEs L=2, 4, and 8 in the R-PDCCH region is 36 (=2×18), 72 (=4×18), and 144 (=8×18), respectively. In other words, the total number of REs with the number of concatenated CCEs (L=1, 2, 4) in the R-PDCCH region shown in FIG. 11B is equal to the total number of REs with the number of concatenated CCEs (L=2, 4, 8) in the R-PDCCH region shown in FIG. 13B.

As a result, the number of REs per CCE is different between the R-PDCCH region in Embodiment 1 and the R-PDCCH region in Embodiment 2, and the present embodiment requires a larger number of concatenated CCEs than that in Embodiment 1 in order to obtain a necessary and sufficient number of REs.

Thus, the number of concatenated CCEs (L=1, 2) is the necessary and sufficient number of concatenated CCEs in the R-PDCCH region of FIG. 11B, whereas the number of concatenated CCEs (L=2, 4) is the necessary and sufficient number of concatenated CCEs in FIG. 13B.

In other words, in the PDCCH region, which has more deteriorated communication quality than that of the R-PDCCH region, the rule for configuring a search space shown in FIG. 13B preferentially reduces the number of blind decoding operations (i.e., number of unit region candidates targeted for decoding) for the smaller number of concatenated CCEs (L=1, 2), which is unlikely to be used for the transmission of DCI. In contrast, in the R-PDCCH region, which has better communication quality than that of the PDCCH region, the rule for configuring a search space shown in FIG. 13B preferentially increases the number of blind decoding operations (i.e., the number of unit region candidates targeted for decoding) for the smaller number of concatenated CCEs (L=2, 4), which is likely to be used for the transmission of DCI.

In this manner, the rule for configuring a search space shown in FIG. 13B configures more unit region candidates targeted for decoding (i.e., number of blind decoding operations) for the number of concatenated CCEs likely to be used for the transmission of DCI in a resource region of each of the PDCCH region and the R-PDCCH region, thereby allowing base station 100 to flexibly allocate DCI for terminal 200 to a PDCCH region and an R-PDCCH region.

As described above, in FIG. 13B, the weighted average of the total number of REs for each number of concatenated CCEs on the number of blind decoding operations associated with the first rule for configuring a search space is larger than that associated with the second rule for configuring a search space. In other words, the average of the total number of REs to be used in the R-PDCCH region may be smaller than that in the PDCCH region. Thus, in an R-PDCCH region, reductions in resources used for DCI to terminal 200 under the control of base station 100 enable flexible resource allocation in the R-PDCCH region from base station 100 to a relay station, thereby allowing improvement in the usage efficiency of the R-PDCCH region.

Allocating section 108 allocates the DCI to unit region candidates for decoding indicated by the search space information from search space configuration section 103. The DCI is then transmitted to terminal 200.

In terminal 200, PDCCH receiving section 207 performs blind decoding on the basis of rules for configuring a search space associated with the case where the search space region information from configuration information receiving section 206 indicates a PDCCH region or an R-PDCCH region. These rules correspond to the above-described rules adopted in base station 100 (e.g., see FIGS. 13A and 13B).

According to the present embodiment, search space configuration section 103 of base station 100, as hereinbefore described, configures a search space defined by a plurality of unit region candidates targeted for decoding. At this time, the number of concatenated CCEs that form the unit region candidates targeted for decoding (the number of concatenated CCEs) is associated with the number of unit region candidates targeted for decoding, and search space configuration section 103 varies the association between the number of concatenated CCEs that form the unit region candidates targeted for decoding (the number of concatenated CCEs) and the number of unit region candidates targeted for decoding depending on the control channel to be transmitted. Specifically, search space configuration section 103 configures a search space on the basis of the rule for configuring a search space depending on each of the PDCCH region and the R-PDCCH region to be configured. In this case, the first rule for configuring a search space for the PDCCH region and the second rule for configuring a search space for the R-PDCCH region each have a different peak of the distributions of unit region candidates targeted for decoding with respect to the number of REs that form unit region candidates targeted for decoding associated with the number of concatenated CCEs.

Also, the pattern of the second rule for configuring a search space used for an R-PDCCH region, which has better communication quality, has a peak of the distribution of the unit region candidates targeted for decoding with respect to the total number of REs which forms each of the unit region candidates targeted for decoding associated with a corresponding number of concatenated CCEs, at a position corresponding to the smaller total number of REs compared with the pattern of the first rule for configuring a search space used for a PDCCH region, which has more deteriorated communication quality.

Thus, a decrease in flexibility of resource allocation in the base station can be prevented without an increase in the number of blind decoding operations to be performed by the terminal during transmission of DCI for the terminal under the control of the base station using a PDCCH region and a R-PDCCH region, even if the PDCCH region and the R-PDCCH region have different number of REs per CCE.

In the present embodiment, the number of concatenated CCEs (L=1 and 2) in the case of the number of REs per CCE being 36 in an R-PDCCH region (Embodiment 1) has been described as the necessary and sufficient number of concatenated CCEs (the number of concatenated CCEs likely to be often used in an R-PDCCH region). The present embodiment, however, may have any other configuration. For example, the number of concatenated CCE (L=1; the total number of REs=36) in the case of the number of REs per CCE being 36 in an R-PDCCH region (Embodiment 1) may be the necessary and sufficient number of concatenated CCE (i.e., number of concatenated CCEs likely to be often used).

In this case, if the number of REs per CCE in the R-PDCCH region is 18, the number of concatenated CCEs (L=1, 2) (total number of REs is 18 and 36; the number of concatenated CCEs associated with the total number of REs being 36 or less) may be the necessary and sufficient number of concatenated CCEs (i.e., number of concatenated CCEs likely to be more used). Thus, base station 100 may configure an increased number of unit region candidates targeted for decoding (i.e., a larger number of blind decoding operations) with respect to the number of concatenated CCEs (L=1, 2), each CCE including 18 REs, in the R-PDCCH region.

In the present embodiment, the number of REs per CCE in the PDCCH region has been described as 36, and the number of REs per CCE in the R-PDCCH region as 18. The claimed invention, however, may have any configuration. For example, even if the number of REs per CCE in an R-PDCCH region is larger than that in a PDCCH region, the advantages of the claimed invention can be achieved as long as the term "the pattern of the second rule for configuring a search space has a peak of the distribution of the unit region candidates targeted for decoding with respect to the total number of REs that form the unit region candidates targeted for decoding associated with the number of concatenated CCEs, at a position corresponding to the smaller total number of REs compared with the pattern of the first rule for configuring a search space" is satisfied (i.e., as long as Equation (2) is satisfied).

(Embodiment 3)

In Embodiment 3, a PDCCH region and an R-PDCCH region each have a different number of REs per CCE (or R-CCE) as in Embodiment 2. Additionally, in Embodiment 3, the PDCCH region and the R-PDCCH region each have a different payload size (or information sizes; hereinafter, referred to as "DCI size") of DCI to be received by a terminal.

Because the basic configuration of a base station and a terminal according to Embodiment 3 is similar to that in Embodiment 1, the configuration in Embodiment 3 will be described with reference to FIGS. 9 and 10.

In base station 100 of Embodiment 3, configuration section 101 configures a resource region used for the transmission of DCI for terminal 200. Candidates to be configured as the resource region include a PDCCH region and an R-PDCCH region. Note that a resource region configured in one subframe may consist of only a PDCCH region or may be both a PDCCH region and an R-PDCCH region.

Search space configuration section 103 configures a search space on the basis of a rule for configuring a search space associated with an configuration resource region indicated by configuration information received from configuration section 101. A rule for configuring a search space for the resource region being a PDCCH region and a rule for configuring a search space for the resource region being an R-PDCCH region have different patterns on the number of unit region candidates targeted for decoding (i.e., number of blind decoding operations by terminal 200) with respect to the number of concatenated CCEs on the basis of "the number of resources (REs) required for the transmission of one bit of DCI (transmission of a unit bit of DCI of a control channel)." In other words, the patterns on the number of unit region candidates targeted for decoding with respect to the number of concatenated CCEs are independently specified for the PDCCH region and the R-PDCCH region, respectively, on the basis of "the number of resources (REs) required for the transmission of one bit of DCI". "The number of resources (REs) required for the transmission of one bit of DCI" is expressed by "the total number of REs associated with the number of concatenated CCEs (=the number of concatenated CCE×the number of REs per CCE)/ DCI size," and/or the like.

FIGS. 15A and 15B are diagrams for explaining rules for configuring a search space according to this embodiment. The rule shown in FIG. 15A for configuring a search space adopted in the case where a resource region configured in one subframe is only a PDCCH region is similar to that in Embodiment 1 (FIG. 11A), and an explanation thereof will be omitted.

For simplicity, "CCE" and "R-CCE" are simply referred to as "CCE" without distinguishing them from each other, and the number of concatenated CCEs and the number of concatenated R-CCEs are simply referred to as "the number of concatenated CCEs" without distinguishing them from each other.

Hereinafter, as in Embodiment 1, terminal 200 (PDCCH receiving section 207) performs blind-decoding for a UE-SS with three DCI formats, and the total number of blind decoding operations in the UE-SS configured for each terminal in one subframe is 48. In Embodiment 1 and Embodiment 2, terminal 200 performs blind decoding with three DCI formats for each of the PDCCH region and the R-PDCCH region. In contrast, in the present embodiment, terminal 200 performs blind decoding for some of DCI formats (for example, one format) for a PDCCH region and for the others of the DCI formats (for example, two formats) for an R-PDCCH region. Accordingly, resource regions have different DCI formats targeted for blind decoding by terminal 200; hence, the PDCCH region and the R-PDCCH region have different DCI sizes.

For example, in this embodiment, the size of DCI transmitted through a PDCCH is larger than that of DCI transmitted through an R-PDCCH. For example, a DCI size in a PDCCH region is 42 bits and a DCI size in an R-PDCCH region is 60 bits.

A PDCCH has a larger number of REs per CCE (a larger number of REs that form a CCE) than that of an R-PDCCH. For example, the number of REs per CCE is 36 in a PDCCH region, and the number of REs per CCE is 18 in an R-PDCCH region.

In the case where resource regions configured in one subframe are a PDCCH region and an R-PDCCH region, rules for configuring a search space adopted for the PDCCH region and the R-PDCCH region are referred to as "first rule for configuring a search space" and "second rule for configuring a search space," respectively.

The assumption in this embodiment is that the number of concatenated CCEs L=1, 2 is the necessary and sufficient number of concatenated CCEs in an R-PDCCH region (i.e., number of concatenated CCEs likely to be often used in an R-PDCCH region), as indicated using the second rule for configuring a search space (FIG. 11B) according to Embodiment 1. Subsequently, the number of REs per CCE is 36 and a DCI size is 60 bits in the R-PDCCH region of Embodiment 1.

The first rule for configuring a search space and the second rule for configuring a search space will now be described below.

For example, on the pattern of the first rule for configuring a search space (for a PDCCH region), the number of blind decoding operations by terminal 200 is 24 operations in total (i.e., 6, 6, 6, 6 with respect to the number of concatenated CCEs L=1, 2, 4, and 8, respectively), as shown in FIG. 15B. On the pattern of the second rule for configuring a search space (for an R-PDCCH region), the number of blind decoding operations by terminal 200 is 24 operations in total (i.e., 4, 8, 8, 4 with respect to the number of concatenated CCEs L=1, 2, 4, and 8, respectively), as shown in FIG. 15B.

Thus, the total number of blind decoding operations in the PDCCH region and the R-PDCCH region by terminal 200 is 48 (=24 for the PDCCH region+24 for the R-PDCCH region). In other words, the configuration of only the PDCCH region (FIG. 15A) and the configuration of the PDCCH region and the R-PDCCH region (FIG. 15B) have the same number of blind decoding operations by terminal 200 (48 operations), as in Embodiment 1.

Figure 16:
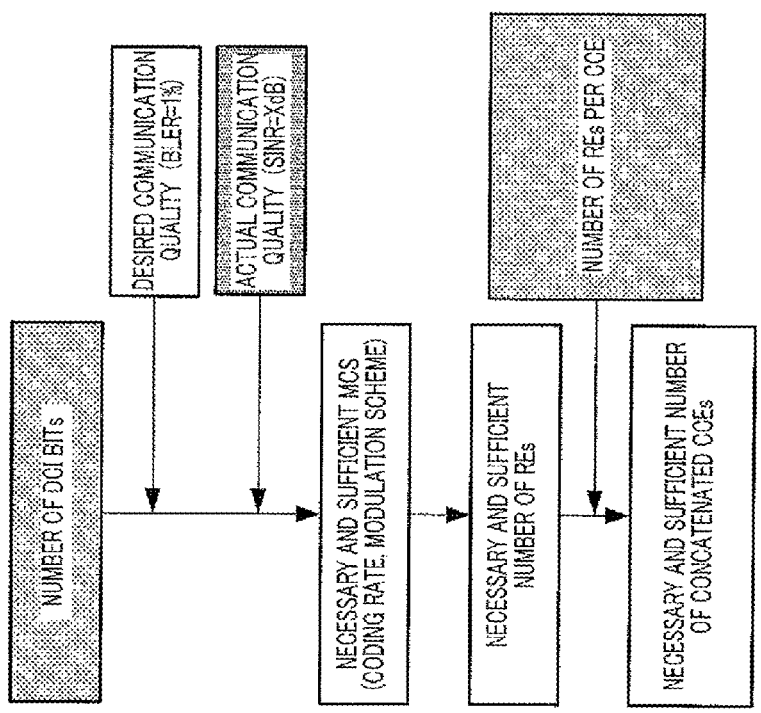
FIG. 16 is a diagram for explaining a method for calculating the necessary and sufficient number of concatenated CCEs according to Embodiment 3 of the claimed invention.

FIG. 16 shows a method for calculating the necessary and sufficient number of concatenated CCEs in base station 100, similarly to FIG. 12. As described in Embodiment 1, the actual communication quality (transmission quality) shown in FIG. 16 is better in an R-PDCCH region than in a PDCCH region. Thus, in FIG. 16, "the number of resources (REs) required for the transmission of one bit of DCI: the total number of REs/DCI size" is smaller in the R-PDCCH region than in the PDCCH region. In other words, the R-PDCCH region can achieve a desired communication quality with the reduced number of "resources (REs) required for the transmission of one bit of DCI: the total number of REs/DCI size" compared to a PDCCH region. In other words, an R-PDCCH region can achieve a desired communication quality to an increased coding rate (reduced redundancy) compared with a PDCCH region.

In FIG. 16, the number of REs (18) that form a CCE in the R-PDCCH region is different from the number of REs (36) that form a CCE in the PDCCH region. Furthermore, in FIG. 16, the DCI size (60 bits) of the R-PDCCH region is different from the DCI size (42 bits) of the PDCCH region. In other words, the PDCCH region and the R-PDCCH region each have a different number of concatenated CCEs corresponding approximately to the same "number of resources (REs) required for the transmission of one bit of DCI: the total number of REs/DCI size."

Thus, in an R-PDCCH region, it is desirable to increase the number of blind decoding operations (i.e., number of unit region candidates targeted for decoding) associated with the number of concatenated CCEs corresponding to the reduced "number of REs required for the transmission of one bit of information (the total number of REs/DCI size)" compared with a PDCCH region. In other words, in an R-PDCCH region, the number of blind decoding operations (the number of unit region candidates targeted for decoding) associated with the number of concatenated CCEs corresponding to a higher coding rate is desirably increased compared with a PDCCH region.

The rules for configuring a search space shown in FIG. 15B satisfy this requirement. Specifically, the patterns of the first rule for configuring a search space and the second rule for configuring a search space shown in FIG. 15B are determined depending on "the total number of REs/DCI size." The pattern of the second rule for configuring a search space has a peak (i.e., a center) of the distribution of unit region candidates targeted for decoding in a search space with respect to "the number of REs required for the transmission of one bit of DCI (transmission per unit bit of DCI of a control channel) in unit region candidates targeted for decoding associated with the number of concatenated CCEs," at a position corresponding to "the smaller number of REs required for the transmission of one bit of DCI," compared with the pattern of the first rule for configuring a search space.

The term "the pattern of the second rule for configuring a search space has a peak of the distribution of the unit region candidates targeted for decoding associated with 'the number of REs required for the transmission of one bit of DCI in unit region candidates targeted for decoding associated with the number of concatenated CCEs,' at a position corresponding to the smaller "number of REs required for the transmission of one bit of DCI," compared to the pattern of the first rule for configuring a search space" has the meaning defined below.

In other words, the weighted average of the "the number of REs required for the transmission of one bit of DCI (=the total number of REs for each number of concatenated CCEs/DCI size)" with respect to the number of blind decoding operations (i.e., number of unit region candidates targeted for decoding) for the second rule for configuring a search space is smaller than that of the first rule for configuring a search space. The weighted average of "the total number of REs for each number of concatenated CCEs/DCI size" with respect to the number of blind decoding operations (i.e., number of unit region candidates targeted for decoding) is expressed by Equation (3):

(Equation 3)

$$\text{Weighted average of numbers of "total numbers of } REs/DCI \text{ size"} = \frac{\sum\limits_{\text{numbers of concatenated CCEs}} \binom{(\text{numbers of concatenated } CCEs) \times (\text{numbers of } REs \text{ per } CCE) \times}{(\text{numbers of blind decoding operations per number of concatenated } CCEs)}}{\text{Total number of blind decoding operations} \times (\text{DCI size})} \quad [3]$$

Because the number of REs per CCE is 36 in a PDCCH region and is 18 in an R-PDCCH region, and DCI sizes are 42 bits in the PDCCH region and 60 bits in the R-PDCCH region, whether the foregoing equation has been satisfied can be confirmed as follows.

The weighted average of "the total number of REs for each number of concatenated CCEs/DCI bits" with respect to the number of blind decoding operations for the first rule for configuring a search space shown in FIG. 15B is "(1×36×6+2×36×6+4×36×6+8×36×6)/((6+6+6+6)×42) being approximately equal to 3.21." The weighted average for the second rule for configuring a search space shown in FIG. 15B is "(1×18×4+2×18×8+4×18×8+8×18×4)/((3+9+9+3)×60)=1.05." Thus, the relationship, "the first rule for configuring a search space> the second rule for configuring a search space" is satisfied.

The second rule for configuring a search space (FIG. 11B) used in the R-PDCCH region in Embodiment 1 is then compared with the second rule for configuring a search space (FIG. 15B) used in the R-PDCCH region in Embodiment 3.

The R-PDCCH region in Embodiment 1 and the R-PDCCH region in the present embodiment each have a different number of REs per CCE and different DCI sizes. In other words, the R-PDCCH region in Embodiment 1 and the R-PDCCH region in the present embodiment each have a different "number of REs used for the transmission of one bit of DCI (=the number of concatenated CCEs×the number of REs per CCE/DCI size)" in each number of concatenated CCEs. Specifically, "the number of REs used for the transmission of one bit of DCI" is (i.e., number of concatenated CCEs×36/42) in FIG. 11B, and "the number of REs used for the transmission of one bit of DCI" is (i.e., number of concatenated CCEs×18/60) in FIG. 15B. In other words, "the number of REs used for the transmission of one bit of DCI" is smaller in the present embodiment (FIG. 15B) than that in Embodiment 1 (FIG. 11B). Consequently, the present embodiment requires a larger number of concatenated CCEs than that in Embodiment 1 in order to obtain the number of resources (REs) required for the transmission of one bit of DCI.

Thus, the number of concatenated CCEs L=1, 2 is the necessary and sufficient number of concatenated CCEs in the R-PDCCH region of FIG. 11B, whereas the number of concatenated CCEs L=2, 4 is the necessary and sufficient number of concatenated CCEs in FIG. 15B.

That is, in the PDCCH region, which has more deteriorated communication quality than that of the R-PDCCH region, the rule for configuring a search space shown in FIG. 15B preferentially reduces the number of blind decoding operations (i.e., number of unit region candidates targeted for decoding) with respect to the number of concatenated CCEs (L=1, 2), which are unlikely to be used for the transmission of DCI. In contrast, in the R-PDCCH region, which has better communication quality than that of the PDCCH region, the rule for configuring a search space shown in FIG. 15B preferentially increases the number of blind decoding operations (i.e., number of unit region candidates targeted for decoding) for the smaller number of concatenated CCEs (L=2, 4), which are likely to be used for the transmission of DCI.

Accordingly, base station 100 can flexibly allocate DCI for terminal 200 to a PDCCH region and an R-PDCCH region.

As described above, in FIG. 15B, the weighted average of "the total number of REs for each number of concatenated CCEs/DCI size" with respect to the number of blind decoding operations associated with the first rule for configuring a search space is larger than that associated with the second rule for configuring a search space. In other words, the average of "the total number of REs/DCI size" to be used in the R-PDCCH region may be smaller than that in the PDCCH region. In other words, the R-PDCCH region may have the larger average of coding rates (i.e., a value proportional to the inverse number of "the total number of REs/DCI size") than that in the PDCCH region. Thus, in an R-PDCCH region, reductions in resources used for DCI to terminal 200 under the control of base station 100 enable flexible resource allocation in the R-PDCCH region from base station 100 to a relay station. This can improve the usage efficiency of the R-PDCCH region.

Allocating section 108 allocates the DCI to unit region candidates targeted for decoding indicated by the search space information from search space configuration section 103. The DCI is then transmitted to terminal 200.

In terminal 200, PDCCH receiving section 207 performs blind decoding on the basis of rules for configuring a search space associated with the case where the search space region information from configuration information receiving section 206 indicates a PDCCH region or an R-PDCCH region. These rules correspond to the above-described rules adopted in base station 100 (for example, see FIGS. 15A and 15B).

According to the present embodiment, search space configuration section 103 of base station 100, as hereinbefore described, configures a search space defined by a plurality of unit region candidates targeted for decoding. At this time, the number of concatenated CCEs that form the unit region candidates targeted for decoding (the number of concatenated CCEs) is associated with the number of unit region candidates targeted for decoding, and search space configuration section 103 varies the association between the number of concatenated CCEs that form the unit region candidates targeted for decoding (the number of concatenated CCEs) and the number of unit region candidates targeted for decoding depending on the control channel to be transmitted. Specifically, search space configuration section 103 configures a search space on the basis of the rule for configuring a search space depending on each of the PDCCH region and the R-PDCCH region to be configured. In this case, the first rule for configuring a search space for the PDCCH region and the second rule for configuring a search space for the R-PDCCH region each have a different peak of the distributions of unit region candidates targeted for decoding with respect to the number of REs required for the transmission of a unit bit of DCI of a control channel in the unit region candidates targeted for decoding associated with each number of concatenated CCEs.

Also, the pattern of the second rule for configuring a search space used for an R-PDCCH region, which has better communication quality, has a peak of the distribution of the unit region candidates targeted for decoding with respect to "the number of REs required for the transmission per unit bit of DCI in unit region candidates targeted for decoding associated with each number of concatenated CCEs," at a position corresponding to the smaller "number of REs required for the transmission of a unit bit of DCI," compared to the pattern of the first rule for configuring a search space used for a PDCCH region, which has more deteriorated communication quality.

Accordingly, a decrease in flexibility of resource allocation in the base station can be prevented without an increase in the number of blind decoding operations to be performed by the terminal during transmission of DCI for the terminal under the control of the base station using a PDCCH region and an R-PDCCH region, even if the PDCCH region and the R-PDCCH region have different DCI sizes.

In the present embodiment, the number of REs per CCE in the PDCCH region has been described as 36 and DCI size as 42 bits, and the number of REs per CCE in the R-PDCCH region has been described as 18 and DCI size as 60 bits. The claimed invention, however, may have any configuration. For example, even if the DCI size of an R-PDCCH region is 42 bits and the DCI size of a PDCCH region is 60 bits, the advantages of the claimed invention can be achieved as long as the term "the pattern of the first rule for configuring a search space has a peak of the distribution of the unit region candidates targeted for decoding corresponding to 'the number of REs required for the transmission of one bit of DCI in the unit region candidates targeted for decoding associated with each number of concatenated CCEs,' at a position corresponding to the smaller 'number of REs required for the transmission of one bit of DCI.'" is satisfied (i.e., as long as Equation (3) is satisfied).

Each embodiment of the claimed invention has been described hereinbefore.

(Other Embodiments)

(1) In the description of the above embodiments, DCI for a terminal has been transmitted using the same number of blind decoding operations to be performed by the terminal both in the case of a resource region being a PDCCH region and the case of resource regions being a PDCCH region and an R-PDCCH region. The claimed invention, however, may have any configuration. For example, in the case where resource regions used for the transmission of DCI to a terminal are both a PDCCH region and an R-PDCCH region, the number of blind decoding operations to be performed by the terminal (i.e., number of unit region candidates targeted for decoding) may be increased compared with the case of a resource region being only a PDCCH region. Accordingly, the flexibility in DCI allocation for a terminal can be further improved in a base station.

(2) Although antennas have been introduced in the embodiments described above, an antenna port is also applicable to the claimed invention.

An antenna port refers to a logical antenna composed of one or more physical antennas. In other words, an antenna port does not necessarily refer to one physical antenna and may refer to an antenna array composed of a plurality of antennas.

For example, 3GPP LTE does not specify the number of physical antennas in an antenna but specifies a minimum unit a base station can transmit different reference signals.

An antenna port may also be specified as a minimum unit which multiplies weights of precoding vectors.

(3) In the foregoing embodiments, the claimed invention is configured with hardware by way of example, but the invention may also be provided by software in cooperation with hardware.

The functional blocks used in the description of the embodiments may be typically implemented as an LSI, an integrated circuit. They may be individual chips, or some of or all of them may be integrated into a single chip. "LSI" is used here, but "IC," "system LSI," "super LSI," or "ultra LSI" may also be adopted depending on the degree of integration.

Alternatively, circuit integration may also be implemented using a dedicated circuit or a general processor other than an LSI. After an LSI is manufactured, an FPGA (field programmable gate array) or a reconfigurable processor which enables the reconfiguration of connection and setting of circuit cells in an LSI may be used.

If integrated circuit technology appears to replace LSIs as a result of the advancement of semiconductor technology or other derivative technology, the functional blocks could be integrated using this technology. Biotechnology can also be applied.

The disclosure of the specification, the drawings, and the abstract included in Japanese Patent Application No. 2010-164308, filed on Jul. 21, 2010, is incorporated herein by reference in its entirety.

INDUSTRIAL APPLICABILITY

The claimed invention is useful to allow for efficient transmission of downlink allocation control information.

REFERENCE SIGNS LIST

100 base station
101 configuration section
102 control section
103 search space configuration section
104 PDCCH generating section
105, 106, 107 coding/modulating section
108 allocating section
109 multiplexing section 110, 213 IFFT section
111, 214 CP adding section
112, 215 RF transmitting section
113, 201 antenna
114, 202 RF receiving section
115, 203 CP removing section
116, 204 FFT section
117 extracting section
118 IDFT section
119 data receiving section
120 ACK/NACK receiving section
131 transmission region configuration section
132 transmission mode configuration section
200 terminal
205 demultiplexing section
206 configuration information receiving section
207 PDCCH receiving section
208 PDSCH receiving section
209, 210 modulating section
211 DFT section
212 mapping section

The invention claimed is:

1. A communication apparatus comprising:
a receiver, which, in operation, receives a control channel transmitted on a search space, which is defined by candidates to be decoded by the communication apparatus; and
a decoder, which, in operation, decodes the control channel,
wherein:
when the communication apparatus is configured to decode the candidates of the search space in each of a first region and a second region, the search space is configured according to each of a first rule that configures the search space in the first region and a second rule that configures the search space in the second region, each of the first and second rules defining an association between an aggregation level of a control channel element (CCE), on which the control channel is transmitted, and a number of the candidates to be decoded, and the association defined in the first rule being different from the association defined in the second rule; and
when the communication apparatus is configured to decode the candidates of the search space in the first region, the search space is configured according to a third rule that configures the search space in the first region, the third rule defining an association between an aggregation level of the CCE, on which the control channel is transmitted, and a number of the candidates to be decoded.

2. The communication apparatus according to claim 1, wherein one of a number of the candidates when the aggregation level is 1 in the second rule and a number of the candidates when the aggregation level is 2 in the second rule is larger than one of a number of the candidates when the aggregation level is 1 in the first rule and a number of the candidates when the aggregation level is 2 in the first rule.

3. The communication apparatus according to claim 1, wherein one of a number of the candidates when the aggregation level is 4 in the second rule and a number of the candidates when the aggregation level is 8 in the second rule is smaller than one of a number of the candidates when the aggregation level is 4 in the first rule and a number of the candidates when the aggregation level is 8 in the first rule.

4. The communication apparatus according to claim 1, wherein one of a number of the candidates when the aggregation level is 1 in the first rule and a number of the candidates when the aggregation level is 2 in the first rule is smaller than one of a number of the candidates when the aggregation level is 1 in the third rule and a number of the candidates when the aggregation level is 2 in the third rule.

5. The communication apparatus according to claim 1, wherein a sum of a total number of the candidates in the first rule and a total number of the candidates in the second rule equals a total number of the candidates in the third rule.

6. The communication apparatus according to claim 1, wherein the first region is configured across a system band, and the second region is configured in a band specific to the communication apparatus.

7. The communication apparatus according to claim 1, wherein the first region is configured from a first symbol to a third symbol in a subframe, and the second region is configured on and after a fourth symbol in the subframe.

8. The communication apparatus according to claim 1, wherein a number of resource elements included in the CCE in the second region is smaller than a number of resource elements included in the CCE in the first region.

9. A communication apparatus comprising:
an antenna; and
circuitry, which, in operation:
receives, through the antenna, a control channel transmitted on a search space, which is defined by candidates to be decoded by the communication apparatus; and
decodes the control channel,
wherein:
when the communication apparatus is configured to decode the candidates of the search space in each of a first region and a second region, the search space is configured according to each of a first rule that configures the search space in the first region and a second rule that configures the search space in the second region, each of the first and second rules defining an association between an aggregation level of a control channel element (CCE), on which the control channel is transmitted, and a number of the candidates to be decoded, and the association defined in the first rule being different from the association defined in the second rule; and
when the communication apparatus is configured to decode the candidates of the search space in the first region, the search space is configured according to a third rule that configures the search space in the first region, the third rule defining an association between an aggregation level of the CCE, on which the control channel is transmitted, and a number of the candidates to be decoded.

10. A communication method comprising:
receiving a control channel transmitted on a search space, which is defined by candidates to be decoded by a communication apparatus; and
decoding the control channel,
wherein:
when the communication apparatus is configured to decode the candidates of the search space in each of a first region and a second region, the search space is configured according to each of a first rule that configures the search space in the first region and a second rule that configures the search space in the second region, each of the first and second rules defining an association between an aggregation level of a control channel element (CCE), on which the control channel is transmitted, and a number of the candidates to be decoded, and the association defined in the first rule being different from the association defined in the second rule; and when the communication apparatus is configured to decode the candidates of the search space in the first region the search space is configured according to a third rule that configures the search space in the first region, the third rule defining an association between an aggregation level of the CCE, on which the control channel is transmitted, and a number of the candidates to be decoded.

11. The communication method according to claim 10, wherein one of a number of the candidates when the aggregation level is 1 in the second rule and a number of the candidates when the aggregation level is 2 in the second rule is larger than one of a number of the candidates when the aggregation level is 1 in the first rule and a number of the candidates when the aggregation level is 2 in the first rule.

12. The communication method according to claim 10, wherein one of a number of the candidates when the aggregation level is 4 in the second rule and a number of the candidates when the aggregation level is 8 in the second rule is smaller than one of a number of the candidates when the aggregation level is 4 in the first rule and a number of the candidates when the aggregation level is 8 in the first rule.

13. The communication method according to claim 10, wherein one of a number of the candidates when the aggregation level is 1 in the first rule and a number of the candidates when the aggregation level is 2 in the first rule is smaller than one of a number of the candidates when the aggregation level is 1 in the third rule and a number of the candidates when the aggregation level is 2 in the third rule.

14. The communication method according to claim 10, wherein a sum of a total number of the candidates in the first rule and a total number of the candidates in the second rule equals a total number of the candidates in the third rule.

15. The communication method according to claim 10, wherein the first region is configured across a system band, and the second region is configured in a band specific to the communication apparatus.

16. The communication method according to claim 10, wherein the first region is configured from a first symbol to a third symbol in a subframe, and the second region is configured on and after a fourth symbol in the subframe.

17. The communication method according to claim 10, wherein a number of resource elements, of which included in the CCE in the second region is smaller than a number of resource elements included in the CCE in the first region.

* * * * *